(12) United States Patent
Sun

(10) Patent No.: US 9,739,976 B2
(45) Date of Patent: Aug. 22, 2017

(54) IMAGING LENS AND IMAGING APPARATUS

(71) Applicant: FUJIFILM Corporation, Tokyo (JP)

(72) Inventor: Ping Sun, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 21 days.

(21) Appl. No.: 14/948,861

(22) Filed: Nov. 23, 2015

(65) Prior Publication Data

US 2016/0147042 A1 May 26, 2016

(30) Foreign Application Priority Data

Nov. 25, 2014 (JP) ................. 2014-237595

(51) Int. Cl.
*G02B 9/00* (2006.01)
*G02B 9/64* (2006.01)
*G02B 13/02* (2006.01)

(52) U.S. Cl.
CPC .............. *G02B 9/64* (2013.01); *G02B 13/02* (2013.01)

(58) Field of Classification Search
CPC ....................................... G02B 9/64
USPC ............................................. 359/740
See application file for complete search history.

(56) References Cited

U.S. PATENT DOCUMENTS

2015/0293327 A1* 10/2015 Tomioka ............... G02B 13/02
359/754

FOREIGN PATENT DOCUMENTS

| JP | H03-141313 A | 6/1991 |
| WO | 2014/097570 A1 | 6/2014 |

* cited by examiner

*Primary Examiner* — James Jones
(74) *Attorney, Agent, or Firm* — Studebaker & Brackett PC

(57) ABSTRACT

An imaging lens includes, in order from the object side: a positive first lens group; a stop; a positive second lens group; and a negative third lens group. The first lens group includes, in order from the object side, at least one positive single lens, at least one cemented lens, at least one negative single lens, and a negative meniscus single lens. The second lens group includes, in order from the object side, a cemented lens and a biconvex lens. The third lens group includes, in order from the object side, a negative meniscus lens, at least one negative lens, and at least one positive lens. Focusing from infinity to a close distance is performed by moving the first lens group, the stop, and the second lens group while the third lens group is fixed with respect to an imaging surface.

18 Claims, 16 Drawing Sheets

EXAMPLE 5

EXAMPLE 1

EXAMPLE 2

EXAMPLE 4

EXAMPLE 7

EXAMPLE 1

FIG.10
EXAMPLE 2
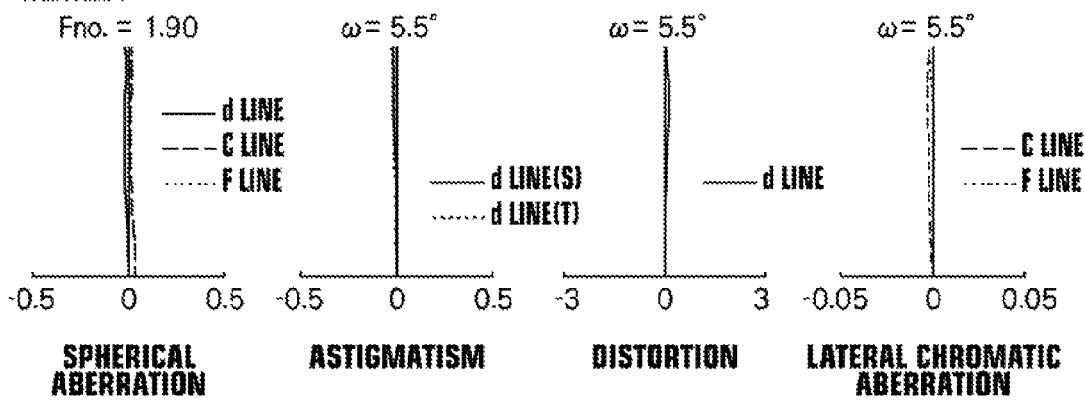
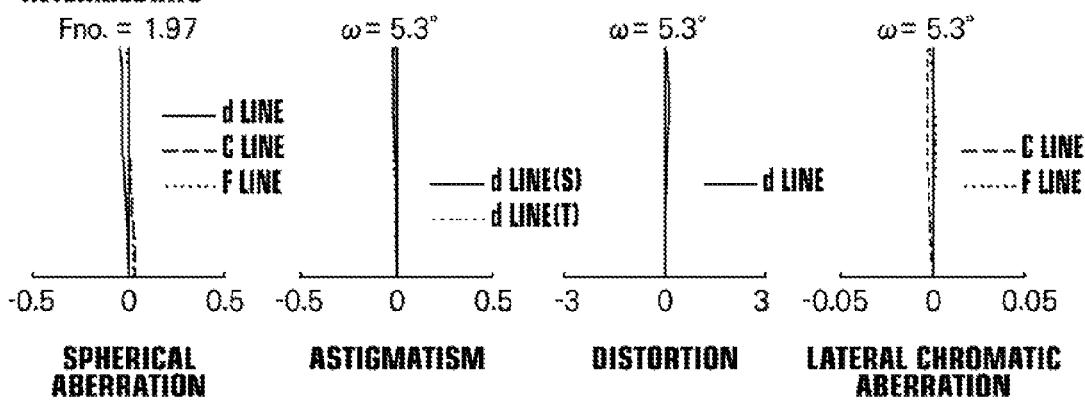
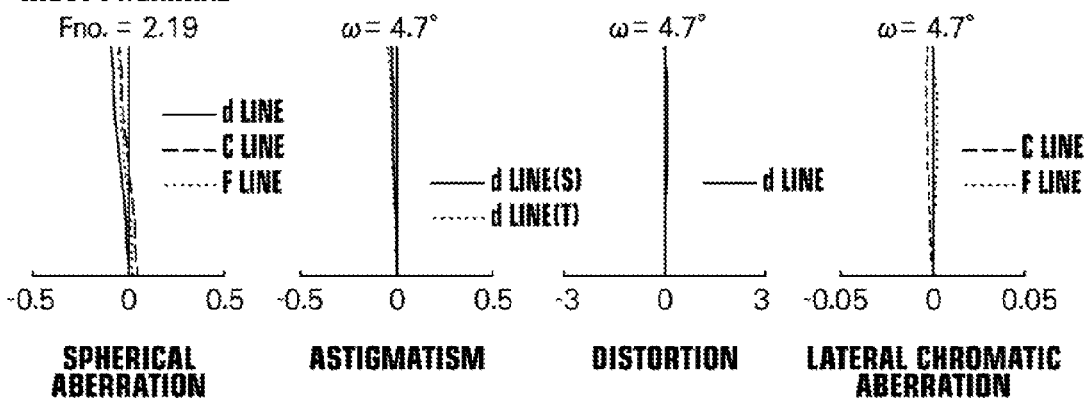

FIG.13
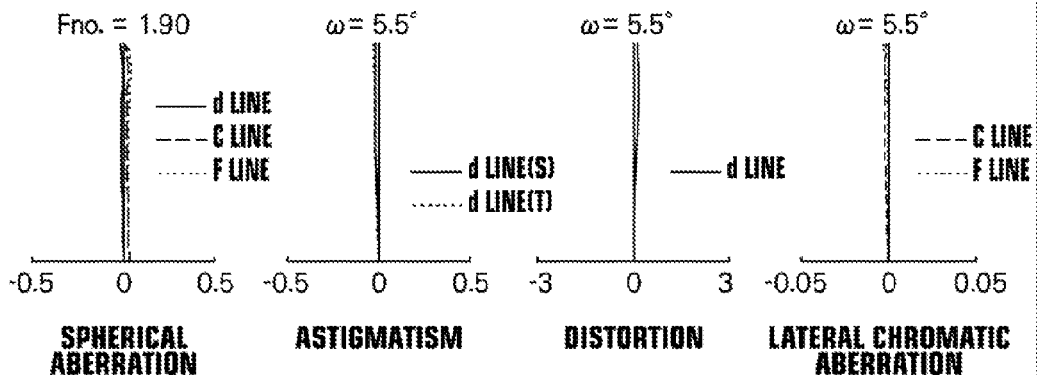
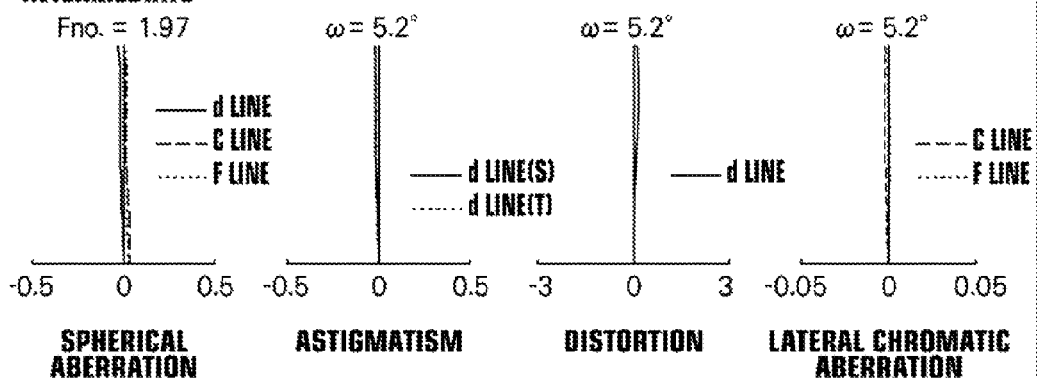
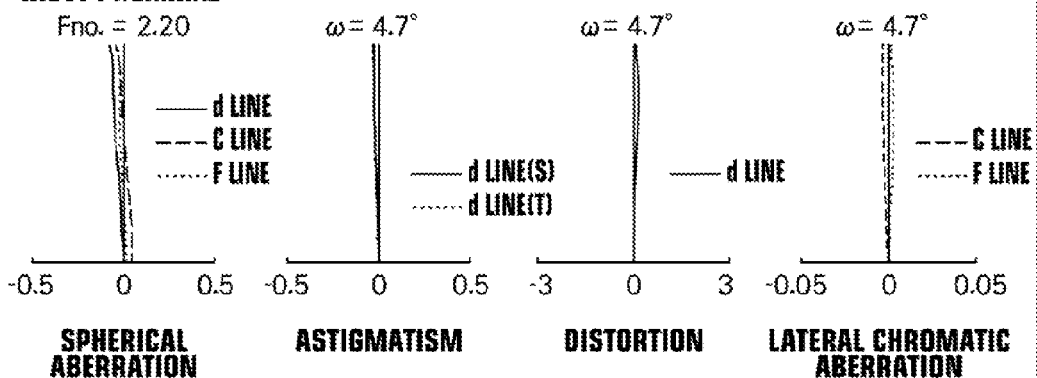

FIG.14
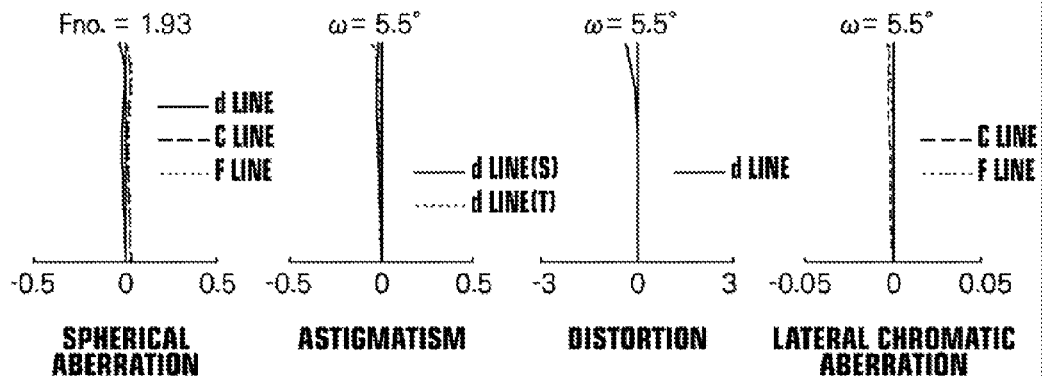
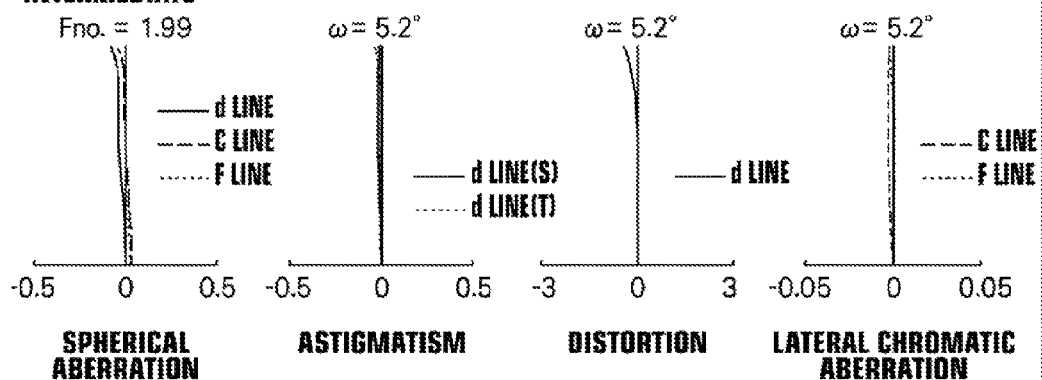
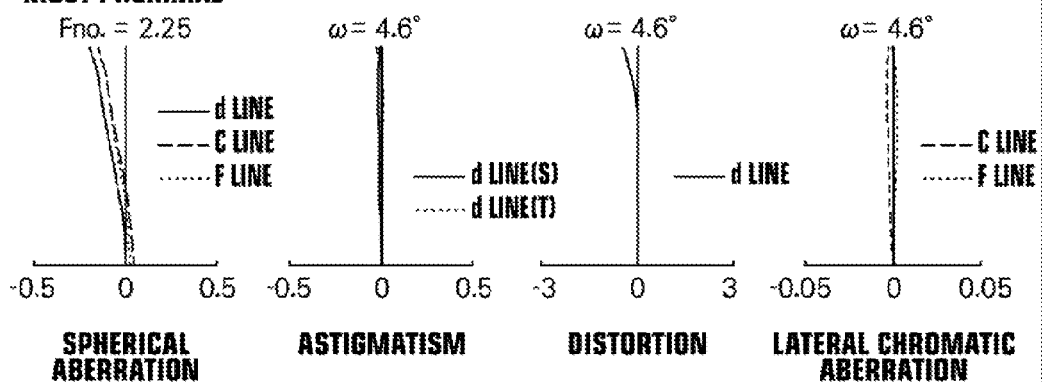

IMAGING LENS AND IMAGING APPARATUS

CROSS REFERENCE TO RELATED APPLICATIONS

The present application claims priority under 35 U.S.C. §119 to Japanese Patent Application No. 2014-237595 filed on Nov. 25, 2014. The above application is hereby expressly incorporated by reference, in its entirety, into the present application.

BACKGROUND

The present disclosure is related to an imaging lens which is favorably suited for use in electronic cameras, such as video cameras, cinema cameras, digital cameras, and surveillance cameras. The present disclosure is also related to an imaging apparatus equipped with this imaging lens.

Recently, cinema cameras and digital cameras are progressively becoming compatible with the 4K and 8K formats. There is demand for lenses which are compatible with a greater number of pixels and in which various aberrations are favorably corrected, as imaging lenses to be employed in such cameras.

Known imaging lenses for use in electronic cameras, such as cinema cameras, digital cameras, video cameras, and surveillance cameras, are disclosed in International Patent Publication No. 2014/097570 and Japanese Unexamined Patent Publication No. 3(1991)-141313. Both International Patent Publication No. 2014/097570 and Japanese Unexamined Patent Publication No. 3(1991)-141313 disclose imaging lenses having a three group configuration.

SUMMARY

However, the ratio of the total length of the lens system with respect to the focal length thereof is not small in the imaging lenses disclosed in International Patent Publication No. 2014/097570, which is disadvantageous from the viewpoint of miniaturization. In addition, it cannot be said that the imaging lens disclosed in Japanese Unexamined Patent Publication No. 3(1991)-141313 sufficiently corrects various aberrations. Accordingly, there is demand for a compact imaging lens in which various aberrations are favorably corrected.

The present disclosure has been developed in view of the foregoing circumstances. The present disclosure provides a compact imaging lens in which various aberrations are favorably corrected, as well as an imaging apparatus equipped with such an imaging lens.

An imaging lens of the present disclosure consists of, in order from the object side to the image side:
 a first lens group having a positive refractive power;
 a stop;
 a second lens group having a positive refractive power; and
 a third lens group having a negative refractive power;
 the first lens group consisting of in order from the object side to the image side, one or more positive single lenses, one or more cemented lenses, one or more negative single lenses, and a negative meniscus single lens having a concave surface toward the image side;
 the second lens group consisting of, in order from the object side to the image side, a cemented lens formed by cementing a negative lens and a biconvex lens, provided in this order from the object side to the image side, together, and a biconvex lens;
 the third lens group consisting of, in order from the object side to the image side, a negative meniscus lens having a concave surface toward the image side, one or more negative lenses, and one or more positive lenses; and
 focusing operations to change focus from an object at infinity to an object at a close distance being performed by moving the first lens group, the stop, and the second lens group toward the object side while the third lens group is fixed with respect to an imaging surface.

In the imaging lens of the present disclosure, it is preferable for Conditional Formula (1) below to be satisfied. Note that it is more preferable for Conditional Formula (1-1) below to be satisfied.

$$0<-f/f3<0.28 \quad (1)$$

$$0.01<-f/f3<0.26 \quad (1\text{-}1)$$

wherein f is the focal length of the entire lens system, and f3 is the focal length of the third lens group.

In addition, it is preferable for Conditional Formula (2) below to be satisfied. Note that it is more preferable for Conditional Formula (2-1) below to be satisfied.

$$0<-f12/f3<0.225 \quad (2)$$

$$0.005<-f12/f3<0.22 \quad (2\text{-}1)$$

wherein f12 is the combined focal length of the first lens group and a second lens group when focused on an object at infinity, and f3 is the focal length of the third lens group.

In addition, it is preferable for Conditional Formula (3) below to be satisfied. Note that it is more preferable for Conditional Formula (3-1) below to be satisfied.

$$0<(R2f-R2r)/(R2f+R2r)<0.15 \quad (3)$$

$$0.05<(R2f-R2r)/(R2f+R2r)<0.14 \quad (3\text{-}1)$$

wherein R2f is the radius of curvature of the surface toward the object side of the negative meniscus single lens within the first lens group, and R2r is the radius of curvature of the surface toward the image side of the negative meniscus single lens within the first lens group.

In addition, it is preferable for Conditional Formula (4) below to be satisfied. Note that it is more preferable for Conditional Formula (4-1) below to be satisfied.

$$0.18<L2/R2f<1.0 \quad (4)$$

$$0.2<L2/R2f<0.6 \quad (4\text{-}1)$$

wherein L2 is the central thickness of the negative meniscus single lens within the first lens group, and R2f is the radius of curvature of the surface toward the object side of the negative meniscus single lens within the first lens group.

In addition, it is preferable for Conditional Formula (5) below to be satisfied. Note that it is more preferable for Conditional Formula (5-1) below to be satisfied.

$$0.1<(R1r-R1f)/(R1r+R1f)<4.0 \quad (5)$$

$$0.5<(R1r-R1f)/(R1r+R1f)<3.0 \quad (5\text{-}1)$$

wherein R1r is the radius of curvature of the surface toward the image side of a negative single lens adjacent to the negative meniscus single lens within the first lens group at the object side thereof, and R1f is the radius of curvature of the surface toward the object side of the negative single lens adjacent to the negative meniscus single lens within the first lens group at the object side thereof.

In addition, it is preferable for a cemented lens formed by cementing a negative lens having a concave surface toward the image side and a positive lens, provided in this order from the object side to the image side, together to be provided adjacent to a single negative lens within the first lens group at the object side thereof.

In addition, it is preferable for Conditional Formula (6) below to be satisfied. Note that it is more preferable for Conditional Formula (6-1) below to be satisfied.

$$0.1 < (R3r - R3f)/(R3r + R3f) < 1.65 \qquad (6)$$

$$0.2 < (R3r - R3f)/(R3r + R3f) < 1.6 \qquad (6\text{-}1)$$

wherein R3r is the radius of curvature of the surface toward the image side of a positive lens provided most toward the image side within the third lens group, and R3f is the radius of curvature of the surface toward the object side of the positive lens provided most toward the image side within the third lens group.

In addition, it is preferable for the second lens group to consist of, in order from the object side to the image side, a cemented lens formed by cementing a biconcave lens and the biconvex lens, provided in this order from the object side to the image side, together, and the biconvex lens.

The imaging lens may be configured such that the first lens group, the stop, and the second lens group move integrally during focusing operations. Alternatively, the lens groups may move toward the object side such that the distance between the first lens group and the second lens group increases when changing focus from an object at infinity to an object at a close distance.

An imaging apparatus of the present disclosure is characterized by being equipped with the imaging lens of the present disclosure.

Note that the expression "consists of" means that the imaging lens may include lenses that practically do not have any power, optical elements other than lenses such as a stop, a mask, a cover glass, and a filter, and mechanical components such as lens flanges, a lens barrel, an imaging element, and a camera shake correcting mechanism, in addition to the component elements listed above.

In addition, the surface shapes, the radii of curvature, and the signs of the refractive powers of the above lenses are those which are considered in the paraxial region in the case that the lenses include aspherical surfaces.

The imaging lens of the present disclosure consists of, in order from the object side to the image side: the first lens group having a positive refractive power; the stop; the second lens group having a positive refractive power; and the third lens group having a negative refractive power. The first lens group consists of, in order from the object side to the image side, one or more positive single lenses, one or more cemented lenses, one or more negative single lenses, and a negative meniscus single lens having a concave surface toward the image side. The second lens group consists of, in order from the object side to the image side, a cemented lens formed by cementing a negative lens and a biconvex lens, provided in this order from the object side to the image side, together, and a biconvex lens. The third lens group consists of, in order from the object side to the image side, a negative meniscus lens having a concave surface toward the image side, one or more negative lenses, and one or more positive lenses. Focusing operations to change focus from an object at infinity to an object at a close distance are performed by moving the first lens group, the stop, and the second lens group toward the object side while the third lens group is fixed with respect to an imaging surface. Therefore, it is possible to configure the imaging lens to be that which is compact, and in which various aberrations are favorably corrected.

In addition, the imaging apparatus of the present disclosure is equipped with the imaging lens of the present disclosure. Therefore, the imaging apparatus of the present disclosure is capable of being configured to be compact, and obtaining images having high image quality.

BRIEF DESCRIPTION OF THE DRAWINGS

FIG. 10 is a collection of diagrams that illustrate aberrations of the imaging lens of Example 2 of the present disclosure.

FIG. 13 is a collection of diagrams that illustrate aberrations of the imaging lens of Example 5 of the present disclosure.

FIG. 14 is a collection of diagrams that illustrate aberrations of the imaging lens of Example 6 of the present disclosure.

DETAILED DESCRIPTION OF THE PREFERRED EMBODIMENTS

Figure 1:
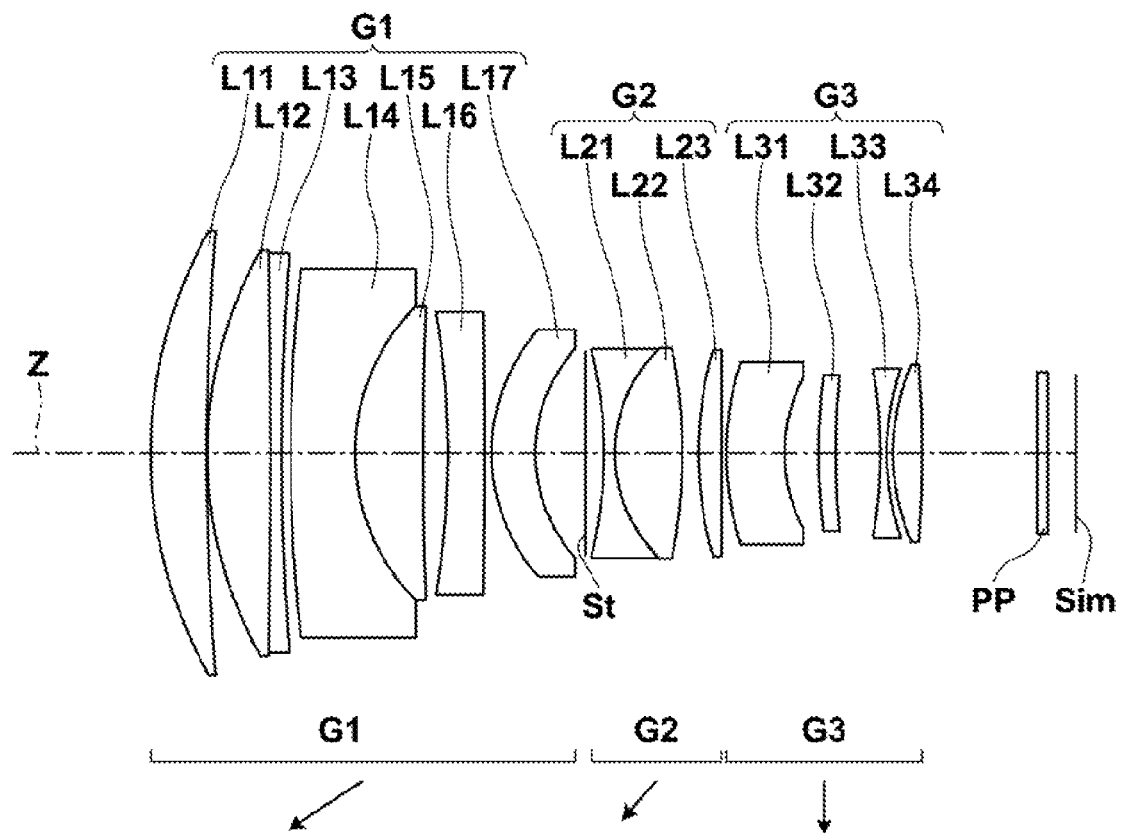
FIG. 1 is a cross sectional diagram that illustrates the lens configuration of an imaging lens according to an embodiment of the present disclosure (common with Example 1).
Figure 8:
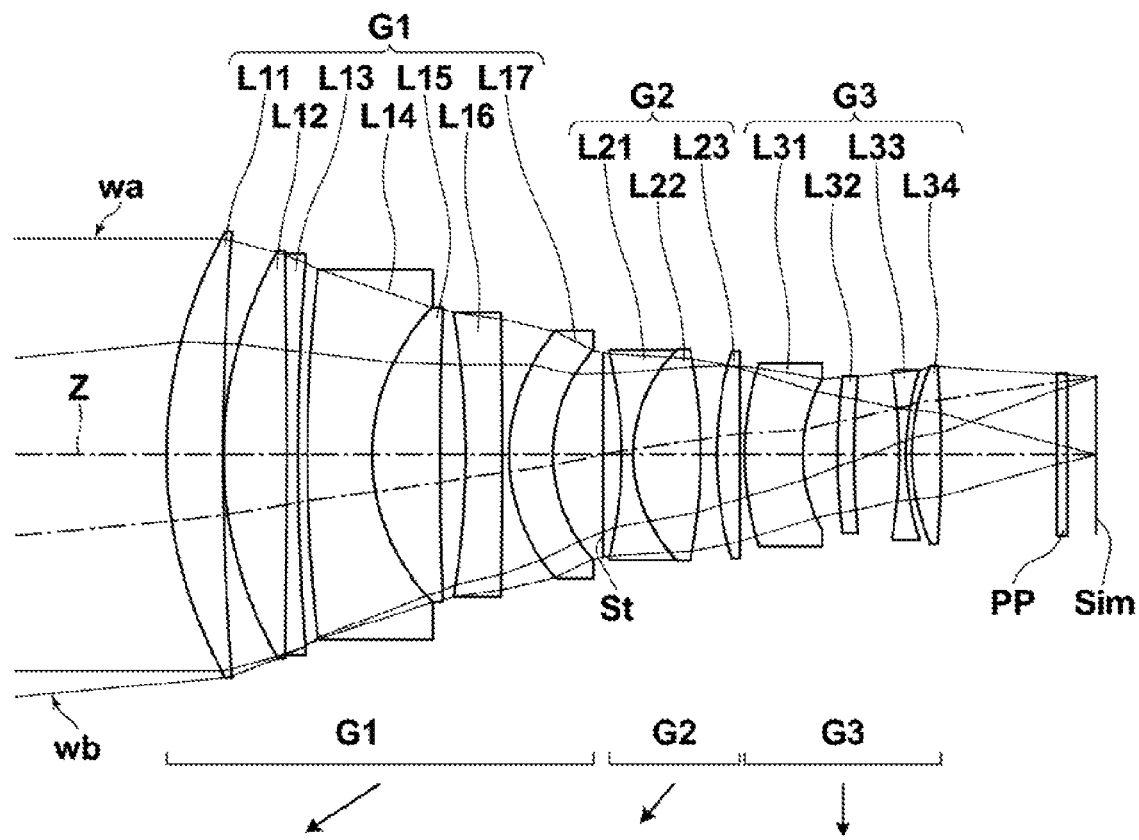
FIG. 8 is a diagram that illustrates the paths of light rays that pass through the imaging lens of Example 1.

Hereinafter, embodiments of the present disclosure will be described in detail with reference to the attached drawings. FIG. 1 is a cross sectional diagram that illustrates the lens configuration of an imaging lens according to an embodiment of the present disclosure, and FIG. 8 is a diagram that illustrates the paths of light rays that pass through this imaging lens. The configurations illustrated in FIGS. 1 and 8 are common with the configuration of an imaging lens according to Example 1, which will be described later. FIGS. 1 and 8 illustrate lenses which are arranged in a state focused on an object at infinity. In FIGS. 1 and 8, the left side is the object side, and the right side is the image side. The aperture stops St illustrated in FIGS. 1 and 8 do not necessarily represent the size or shape thereof, but the position of the stop along an optical axis Z. In addition, FIG. 8 illustrates an axial light beam wa and a light beam wb at a maximum angle of view.

As illustrated in FIGS. 1 and 8, this imaging lens consists of, in order from the object side to the image side, a first lens group G1 having a positive refractive power, an aperture stop St, a second lens group G2 having a positive refractive power, and a third lens group G3 having a negative refractive power.

Figure 9:
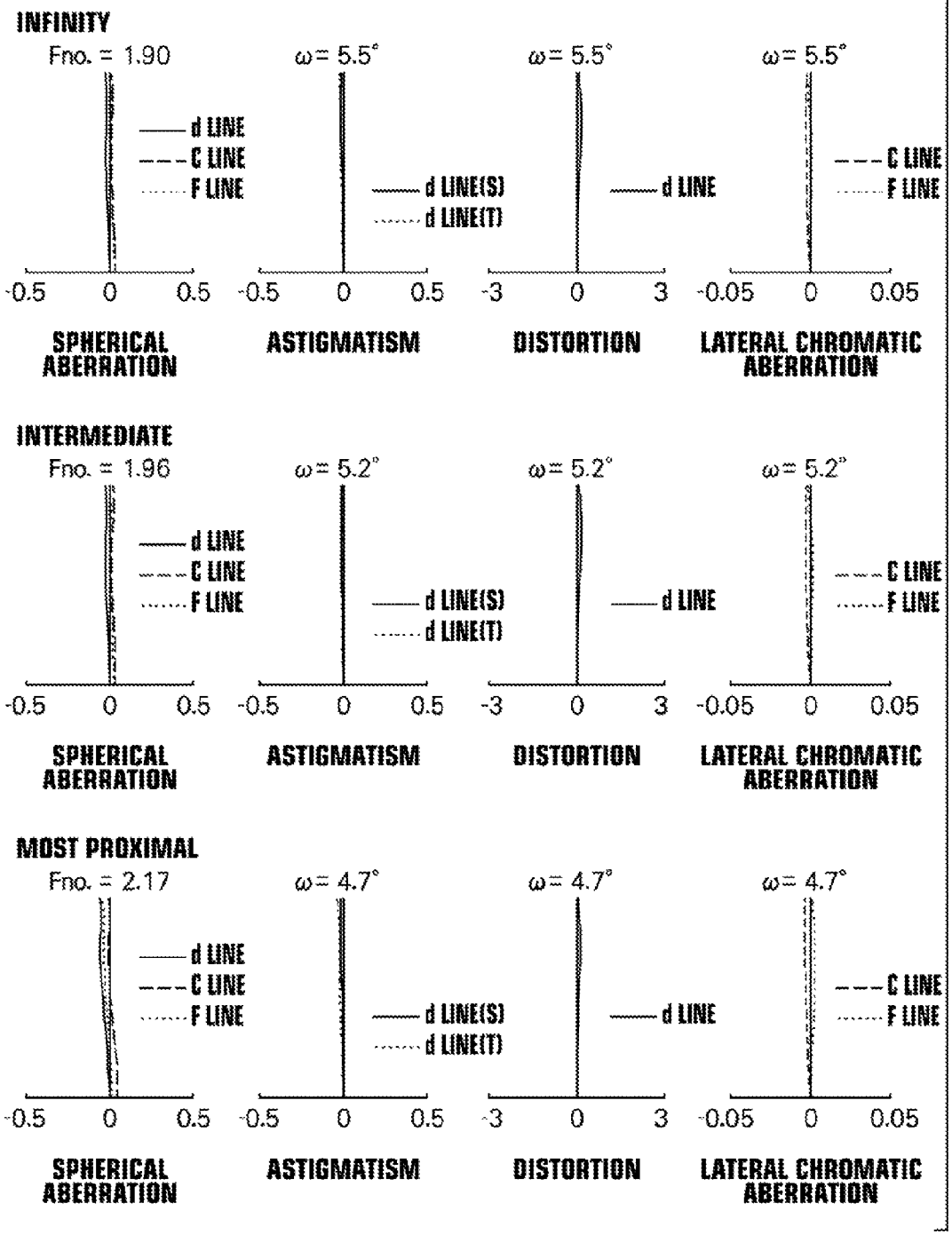
FIG. 9 is a collection of diagrams that illustrate aberrations of the imaging lens of Example 1 of the present disclosure.

When this imaging lens is applied to an imaging apparatus, it is preferable for a cover glass, a prism, and various filters, such as an infrared cutoff filter and a low pass filter, to be provided between the optical system and an imaging surface Sim, depending on the configuration of the camera to which the lens is mounted. Therefore, FIGS. 1 and 9 illustrate examples in which a plane parallel plate shaped optical member PP that presumes such components is provided between the rear group G2 and the imaging surface Sim.

The first lens group G1 is constituted by, in order from the object side to the image side, one or more positive single lenses, one or more cemented lenses, one or more negative single lenses, and a negative meniscus single lens having a concave surface toward the image side.

In addition, the second lens group G2 is constituted by, in order from the object side to the image side, a cemented lens formed by cementing a negative lens and a biconvex lens, provided in this order from the object side to the image side, together, and a biconvex lens.

In addition, the third lens group G3 is constituted by, in order from the object side to the image side, a negative meniscus lens having a concave surface toward the image side, one or more negative lenses, and one or more positive lenses.

In addition, the imaging lens is configured such that focusing operations to change focus from an object at infinity to an object at a close distance are performed by moving the first lens group G1, the aperture stop St, and the second lens group G2 toward the object side while the third lens group G3 is fixed with respect to the imaging surface.

Configuring the first lens group G1 and the second lens group G2 to have negative refractive powers as described above distributes positive refractive power between two lens groups. Thereby, spherical aberration can be suppressed.

In addition, the total length of the lens system can be shortened and the amount of movement of the first lens group G1, the aperture stop St, and the second lens group G2 during focusing operations can be decreased, by adopting a telephoto type configuration in which the first lens group G1 has a positive refractive power, the second lens group G2 has a positive refractive power, and the third lens group G3 has a negative refractive power.

In addition, chromatic aberrations can be favorably corrected by providing a cemented lens in the first lens group G1. Further, various aberrations such as astigmatism, field curvature, and lateral chromatic aberration can be favorably corrected by the negative single lens and the negative meniscus single lens having the concave surface toward the image side at the image side of the cemented lens. In addition, the ratio of the total length of the lens system with respect to the focal length can be decreased, or the lens diameter can be decreased, by providing the negative single lens at the object side of the negative meniscus single lens.

In the imaging lens of the present embodiment, it is preferable for Conditional Formula (1) below to be satisfied. The refractive power of the third lens group G3 can be prevented from becoming excessively weak by configuring imaging lens such that the value of −f/f3 is not less than or equal to the lower limit defined in Conditional Formula (1). As a result, spherical aberration being excessively corrected and field curvature being insufficiently corrected can be prevented, or the total length of the lens system becoming longer can be prevented. The refractive power of the third lens group G3 can be prevented from becoming excessively strong by configuring imaging lens such that the value of f/f3 is not greater than or equal to the upper limit defined in Conditional Formula (1). As a result, spherical aberration being insufficiently corrected and field curvature being excessively corrected can be prevented, or an increase in lateral chromatic aberration can be prevented. Note that more favorable properties can be obtained if Conditional Formula (1-1) is satisfied.

$$0 < -f/f3 < 0.28 \quad (1)$$

$$0.01 < -f/f3 < 0.26 \quad (1\text{-}1)$$

wherein f is the focal length of the entire lens system, and f3 is the focal length of the third lens group.

In addition, it is preferable for Conditional Formula (2) below to be satisfied. The ratio of the combined refractive power of the first lens group G1 and the second lens group G2 and the refractive power of the third lens group G3 can be prevented from becoming asymmetrical by configuring the imaging lens such that the value of −f12/f3 is not greater than or equal to the upper limit defined in Conditional Formula (2). Adopting such a configuration is advantageous is advantageous from the viewpoints of shortening the total length of the lens system and focusing on objects at a most proximal distance. Note that more favorable properties can be obtained if Conditional Formula (2-1) is satisfied. Here, the combined focal length of the first lens group G1 and the second lens group G2 can be prevented from becoming excessively short by configuring the imaging lens such that the value of −f12/f3 is not less than or equal to the upper limit defined in Conditional Formula (2-1). As a result, spherical aberration being insufficiently corrected can be prevented, or the refractive power of the third lens group G3 becoming excessively weak can be prevented. Therefore, spherical aberration being excessively corrected and field curvature being insufficiently corrected when focusing on objects at a most proximal distance can be prevented.

$$0 < -f12/f3 < 0.225 \quad (2)$$

$$0.005 < -f12/f3 < 0.22 \quad (2\text{-}1)$$

wherein f12 is the combined focal length of the first lens group and a second lens group when focused on an object at infinity, and f3 is the focal length of the third lens group.

In addition, it is preferable for Conditional Formula (3) below to be satisfied. Configuring the imaging lens such that the value of (R2f−R2r)/(R2f+R2r) is not less than or equal to the lower limit defined in Conditional Formula (3) is advantageous from the viewpoint of shortening the total length of the lens system. In addition, configuring the imaging lens such that the value of (R2f−R2r)/(R2f+R2r) is not greater than or equal to the upper limit defined in Conditional Formula (3) is advantageous from the viewpoint of correcting aberrations which are generated in the first lens group G1, and particularly spherical aberration. Note that more favorable properties can be obtained if Conditional Formula (3-1) is satisfied.

$$0<(R2f-R2r)/(R2f+R2r)<0.15 \quad (3)$$

$$0.05<(R2f-R2r)/(R2f+R2r)<0.14 \quad (3\text{-}1)$$

wherein R2f is the radius of curvature of the surface toward the object side of the negative meniscus single lens within the first lens group, and R2r is the radius of curvature of the surface toward the image side of the negative meniscus single lens within the first lens group.

In addition, it is preferable for Conditional Formula (4) below to be satisfied. Configuring the imaging lens such that the value of L2/R2f is not less than or equal to the lower limit defined in Conditional Formula (4) is advantageous from the viewpoint of correcting spherical aberration. In addition, configuring the imaging lens such that the value of L2/R2f is not greater than or equal to the upper limit defined in Conditional Formula (4) is advantageous from the viewpoint of correcting astigmatism and field curvature. Note that more favorable properties can be obtained if Conditional Formula (4-1) is satisfied.

$$0.18<L2/R2f<1.0 \quad (4)$$

$$0.2<L2/R2f<0.6 \quad (4\text{-}1)$$

wherein L2 is the central thickness of the negative meniscus single lens within the first lens group, and R2f is the radius of curvature of the surface toward the object side of the negative meniscus single lens within the first lens group.

In addition, it is preferable for Conditional Formula (5) below to be satisfied. Configuring the imaging lens such that the value of (R1r−R1f)/(R1r+R1f) is not less than or equal to the lower limit defined in Conditional Formula (5) is advantageous from the viewpoint of correcting spherical aberration. In addition, configuring the imaging lens such that the value of (R1r−R1f)/(R1r+R1f) is not greater than or equal to the upper limit defined in Conditional Formula (5) is advantageous from the viewpoint of correcting astigmatism and field curvature. Note that more favorable properties can be obtained if Conditional Formula (5-1) below is satisfied.

$$0.1<(R1r-R1f)/(R1r+R1f)<4.0 \quad (5)$$

$$0.5<(R1r-R1f)/(R1r+R1f)<3.0 \quad (5\text{-}1)$$

wherein R1r is the radius of curvature of the surface toward the image side of a negative single lens adjacent to the negative meniscus single lens within the first lens group at the object side thereof, and R1f is the radius of curvature of the surface toward the object side of the negative single lens adjacent to the negative meniscus single lens within the first lens group at the object side thereof In addition, it is preferable for a cemented lens formed by cementing a negative lens having a concave surface toward the image side and a positive lens, provided in this order from the object side to the image side, together to be provided adjacent to a single negative lens within the first lens group at the object side thereof. Adopting such a configuration enables chromatic aberrations to be corrected.

In addition, it is preferable for Conditional Formula (6) below to be satisfied. Configuring the imaging lens such that the value of (R3r−R3f)/(R3r+R3f) is not less than or equal to the lower limit defined in Conditional Formula (6) is advantageous from the viewpoint of correcting astigmatism and field curvature. In addition, configuring the imaging lens such that the value of (R3r−R3f)/(R3r+R3f) is not greater than or equal to the upper limit defined in Conditional Formula (6) is advantageous from the viewpoint of correcting spherical aberration and lateral chromatic aberration. Note that more favorable properties can be obtained if Conditional Formula (6-1) below is satisfied.

$$0.1<(R3r-R3f)/(R3r+R3f)<1.65 \quad (6)$$

$$0.2<(R3r-R3f)/(R3r+R3f)<1.6 \quad (6\text{-}1)$$

wherein R3r is the radius of curvature of the surface toward the image side of a positive lens provided most toward the image side within the third lens group, and R3f is the radius of curvature of the surface toward the object side of the positive lens provided most toward the image side within the third lens group.

In addition, it is preferable for the second lens group to be constituted by, in order from the object side to the image side, a cemented lens formed by cementing a biconcave lens and the biconvex lens, provided in this order from the object side to the image side, together, and the biconvex lens. By adopting such a configuration, it will become possible to correct fluctuations in field curvature that accompany focusing operations.

The imaging lens may be configured such that the first lens group G1, the aperture stop St, and the second lens group G2 move integrally during focusing operations. By adopting such a configuration, the mechanism for performing focusing operations can be simplified, and therefore focusing precision can be improved. Alternatively, the lens groups may move toward the object side such that the distance between the first lens group G1 and the second lens group G2 increases when changing focus from an object at infinity to an object at a close distance. By adopting such a configuration, fluctuations in aberrations such as spherical aberration and astigmatism can be suppressed.

In the case that the present imaging lens is to be utilized in a severe environment, it is preferable for a protective multiple layer film coating to be administered. Further, a reflection preventing coating may be administered in order to reduce the amount of ghost light during use, in addition to the protective coating.

In addition, FIG. 1 illustrates an example in which the optical member PP is provided between the lens system and the imaging surface Sim. Alternatively, various filters such as low pass filters and filters that cut off specific wavelength bands may be provided among each of the lenses instead of being provided between the lens system and the imaging surface Sim. As a further alternative, coatings that have the same functions as the various filters may be administered on the surfaces of the lenses.

Next, examples of numerical values of the imaging lens of the present disclosure will be described.

First, the imaging lens of Example 1 will be described. FIG. 1 is a cross sectional diagram that illustrates the lens configuration of the imaging lens of Example 1. Note that in FIG. 1 and FIGS. 2 through 7 corresponding to Examples 2 through 7 to be described later, the left side is the object side, and the right side is the image side. In addition, the aperture stops St illustrated in FIGS. 1 through 8 do not necessarily represent the size or shape thereof, but the position of the stop along optical axes Z.

In the imaging lens of Example 1, the first lens group G1 is constituted by, in order from the object side to the image side, a positive meniscus lens L11 having a convex surface toward the object side, a cemented lens formed by cementing a biconvex lens L12 and a biconvex lens L13 together, a cemented lens formed by cementing a negative meniscus lens L14 having a convex surface toward the object side and a positive meniscus lens L15 together, a negative meniscus lens L16 having a convex surface toward the image side, and a negative meniscus lens L17 having a convex surface toward the object side. The second lens group G2 is constituted by a cemented lens formed by cementing a biconcave lens L21 and a biconvex lens L22 together, and a biconvex lens L23. The third lens group G3 is constituted by a negative meniscus lens L31 having a convex surface toward the object side, a positive meniscus lens having a convex surface toward the object side, a biconcave lens L33, and a biconvex lens L34.

The imaging lens of Example 1 is configured such that the first lens group G1 and the second lens group G2 move toward the object side such that the distance therebetween becomes greater, when changing focus from an object at infinity to an object at a close distance. At this time, the aperture stop St moves integrally with the second lens group G1. Note that the aperture stop St may move integrally with the first lens group G1, or move along a different trajectory from those of the first lens group G1 and the second lens group G2.

Correction of chromatic aberrations and spherical aberration is facilitated, by providing the two cemented lenses within the first lens group G1 as described above. In addition, the generation of spherical aberration can be suppressed, by the positive meniscus lens L11 having a convex surface toward the object side. In addition, correction of spherical aberration is facilitated, by the negative meniscus lens L16 having a concave surface toward the object side.

Basic lens data are shown in Table 1, data related to various items are shown in Table 2, and data related to distances among moving surfaces are shown in Table 3, for the imaging lens of Example 1. In the following description, the meanings of the symbols in the tables will be described for Example 1. The meanings of the symbols are basically the same for Examples 2 through 7. Note that the numerical values shown in Tables 1 through 22 below and the aberration diagrams of FIGS. 9 through 15 are those for a state in which the focal length of the entire lens system when focused on an object at infinity is normalized to be 100.

In the lens data of Table 1, surface numbers that sequentially increase from the object side to the image side, with the surface of the constituent element at the most object side designated as first, are shown in the column "Surface Number". The radii of curvature of each of the surfaces are shown in the column "Radius of Curvature". The distances between a surface and an adjacent surface along the optical axis Z are shown in the column "Distance". The refractive indices of each optical element with respect to the d line (wavelength: 587.6 nm) are shown in the column "nd". The Abbe's numbers of each optical element with respect to the d line (wavelength: 587.6 nm) are shown in the column "vd".

Here, the signs of the radii of curvature are positive in cases that the surface shape is convex toward the object side, and negative in cases that the surface shape is convex toward the image side. The aperture stop St and the optical member PP are also included in the basic lens data. Text reading "(aperture stop)" is indicated along with a surface number in the column of the surface numbers at the surface corresponding to the aperture stop St. In addition, DD [i] is shown in the rows for distances that change when changing magnification in the lens data of Table 1. Numerical values that correspond to DD [i] are shown in Table 3.

Table 2 shows the values of the angular magnification rate p, the F value (FNo.), and the full angle of view $2w$ in a state focused on an object at infinity, in a state focused on an object at an intermediate distance, and in a state focused on an object at a most proximal distance, as the data related to various items.

In the basic lens data and the data related to various items, degrees are used as the units for angles. The other values are normalized, and therefore no units are employed for these values.

TABLE 1

Example 1: Lens Data

| Surface Number | Radius of Curvature | Distance | nd | vd |
|---|---|---|---|---|
| 1 | 55.16579 | 6.896 | 1.58913 | 61.13 |
| 2 | 337.19708 | 0.055 | | |
| 3 | 50.17570 | 7.727 | 1.49700 | 81.54 |
| 4 | −1298.19947 | 1.389 | 1.51742 | 52.43 |
| 5 | 312.70604 | 1.111 | | |
| 6 | 194.56044 | 7.911 | 1.80400 | 46.58 |
| 7 | 25.33970 | 8.334 | 1.49700 | 81.54 |
| 8 | 473.46238 | 3.052 | | |
| 9 | −105.12795 | 4.578 | 1.48749 | 70.24 |
| 10 | −779.42142 | 0.803 | | |
| 11 | 22.73529 | 5.388 | 1.84666 | 23.88 |
| 12 | 19.08845 | DD [12] | | |
| 13 (aperture stop) | ∞ | 2.214 | | |
| 14 | −51.75685 | 1.395 | 1.48749 | 70.44 |
| 15 | 17.89172 | 8.233 | 1.49700 | 81.54 |
| 16 | −65.51820 | 1.975 | | |
| 17 | 44.27705 | 2.821 | 1.51633 | 64.14 |
| 18 | −3756.89680 | DD [18] | | |
| 19 | 37.46282 | 7.103 | 1.80000 | 29.84 |
| 20 | 19.27561 | 4.214 | | |
| 21 | 80.97188 | 2.078 | 1.43875 | 94.94 |
| 22 | 96.90971 | 5.456 | | |
| 23 | −59.21829 | 0.834 | 1.51633 | 64.14 |
| 24 | 31.74653 | 0.781 | | |
| 25 | 27.53782 | 3.500 | 1.83481 | 42.72 |
| 26 | −154.40556 | 14.206 | | |
| 27 | ∞ | 1.278 | 1.51633 | 64.14 |
| 28 | ∞ | 3.983 | | |

TABLE 2

Example 1: Items (d line)

| Focus Position | Infinity | Intermediate | Proximate |
|---|---|---|---|
| β | 0 | −0.026 | −0.134 |
| FNo. | 1.90 | 1.96 | 2.17 |
| 2ω (°) | 11.0 | 10.4 | 9.4 |

TABLE 3

Example 1: Variable Distances

| Focus Position | Infinity | Intermediate | Proximate |
|---|---|---|---|
| DD [12] | 6.213 | 6.773 | 6.997 |
| DD [18] | 0.634 | 2.278 | 7.882 |

Diagrams that illustrate various aberrations of the imaging lens of Example 1 are illustrated in FIG. 9. Note that the diagrams in the upper portion of FIG. 9 illustrate spherical aberration, astigmatism, distortion, and lateral chromatic aberration in a state focused on an object at infinity from the left to the right of the drawing sheet, the diagrams in the middle portion of FIG. 9 illustrate spherical aberration, astigmatism, distortion, and lateral chromatic aberration in a state focused on an object at an intermediate distance from the left to the right of the drawing sheet, and the diagrams in the lower portion of FIG. 9 illustrate spherical aberration, astigmatism, distortion, and lateral chromatic aberration in a state focused on an object at a most proximal distance from the left to the right of the drawing sheet. The diagrams that illustrate spherical aberration, astigmatism, and distortion show aberrations related to the d line (wavelength: 587.6 nm). The diagrams that illustrate spherical aberration show aberrations related to the d line (wavelength: 587.6 nm), aberrations related to the C line (wavelength: 656.3 nm), and aberrations related to the F line (wavelength: 486.1 nm), as solid lines, broken lines, and dotted lines, respectively. In the diagrams that illustrate astigmatism, aberrations in the sagittal direction are indicated by solid lines, while aberrations in the tangential direction are indicated by dotted lines. In the diagrams that illustrate lateral chromatic aberration, aberrations related to the C line (wavelength: 656.3 nm) and aberrations related to the F line (wavelength: 486.1 nm) are shown as broken lines and dotted lines, respectively. Note that in the diagrams that illustrate spherical aberrations, "Fno." denotes F values. In the other diagrams that illustrate the aberrations, "ω" denotes half angles of view.

The symbols, meanings, and the manners in which each item of data is shown in the description of Example 1 applies to the other Examples unless particularly noted. Therefore, redundant descriptions will be omitted hereinbelow.

Figure 2:
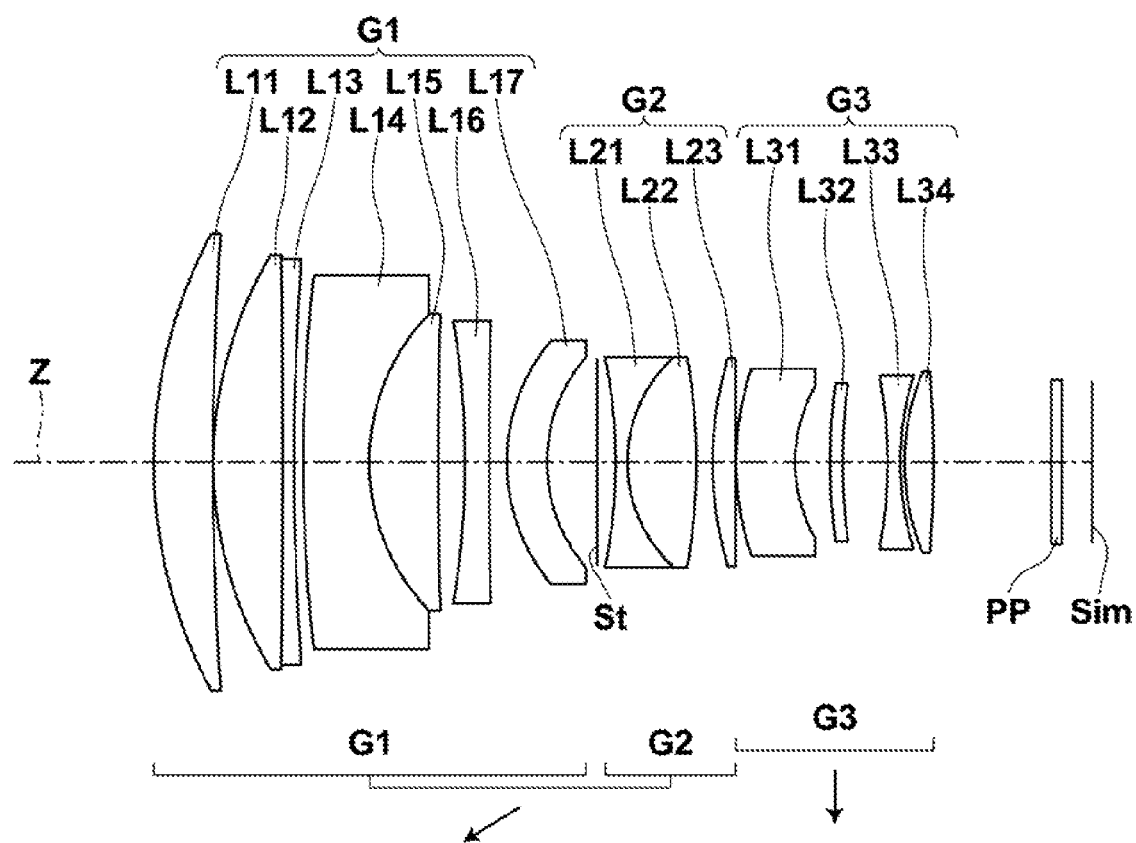
FIG. 2 is a cross sectional diagram that illustrates the lens configuration of an imaging lens according to Example 2 of the present disclosure.

Next, an imaging lens of Example 2 will be described. FIG. 2 is a cross sectional diagram that illustrates the lens configuration of the imaging lens of Example 2. In addition, basic lens data are shown in Table 4, data related to various items are shown in Table 5, and data related to distances among movable surfaces are shown in Table 6 for the imaging lens of Example 2. Various aberrations of the imaging lens of Example 2 are illustrated in the diagrams of FIG. 10. The imaging lens of Example 2 differs from the imaging lens of Example 1 in that a negative lens L16 within a first lens group G1 is of a biconcave shape. In addition, the imaging lens of Example 2 is configured such that the first lens group G1, an aperture stop St, and a second lens group G2 move integrally during focusing operations.

TABLE 4

Example 2: Lens Data

| Surface Number | Radius of Curvature | Distance | nd | vd |
|---|---|---|---|---|
| 1 | 57.95431 | 7.141 | 1.58913 | 61.13 |
| 2 | 413.24908 | 0.055 | | |
| 3 | 48.22427 | 8.345 | 1.49700 | 81.54 |
| 4 | −1677.67287 | 1.390 | 1.51742 | 52.43 |
| 5 | 330.30659 | 1.118 | | |
| 6 | 198.81522 | 7.975 | 1.80400 | 46.58 |
| 7 | 25.63471 | 8.339 | 1.49700 | 81.54 |
| 8 | 601.84344 | 3.236 | | |
| 9 | −102.52716 | 2.909 | 1.48749 | 70.24 |
| 10 | 779.87177 | 2.130 | | |
| 11 | 22.66627 | 4.875 | 1.84666 | 23.88 |
| 12 | 19.19346 | 6.100 | | |
| 13 (aperture stop) | ∞ | 2.241 | | |
| 14 | −60.76825 | 1.396 | 1.48749 | 70.44 |
| 15 | 17.06483 | 8.339 | 1.49700 | 81.54 |
| 16 | −71.43467 | 1.976 | | |
| 17 | 43.85836 | 2.774 | 1.51633 | 64.14 |
| 18 | −26754.05746 | DD [18] | | |
| 19 | 35.35346 | 7.132 | 1.80000 | 29.84 |
| 20 | 18.58751 | 4.215 | | |
| 21 | 68.12903 | 1.531 | 1.43875 | 94.94 |
| 22 | 71.30959 | 5.430 | | |
| 23 | −53.89986 | 1.528 | 1.51633 | 64.14 |
| 24 | 34.54141 | 0.519 | | |
| 25 | 28.15397 | 3.502 | 1.83481 | 42.72 |
| 26 | −130.49011 | 14.215 | | |
| 27 | ∞ | 1.279 | 1.51633 | 64.14 |
| 28 | ∞ | 4.174 | | |

TABLE 5

Example 2: Items (d line)

| Focus Position | Infinity | Intermediate | Proximate |
|---|---|---|---|
| β | 0 | −0.026 | −0.134 |
| FNo. | 1.90 | 1.97 | 2.19 |
| 2ω (°) | 11.0 | 10.6 | 9.4 |

TABLE 6

Example 2: Variable Distances

| Focus Position | Infinity | Intermediate | Proximate |
|---|---|---|---|
| DD [18] | 0.056 | 1.949 | 7.629 |

Figure 3:
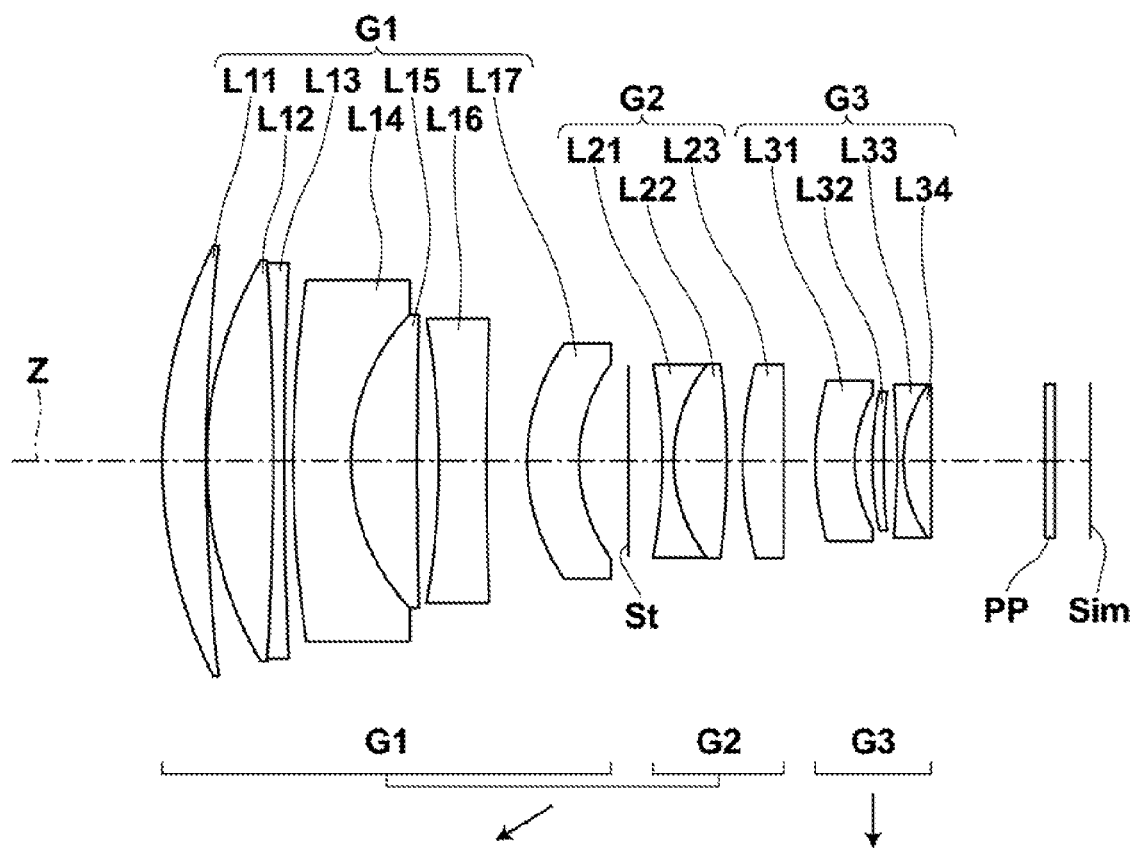
FIG. 3 is a cross sectional diagram that illustrates the lens configuration of an imaging lens according to Example 3 of the present disclosure.
Figure 11:
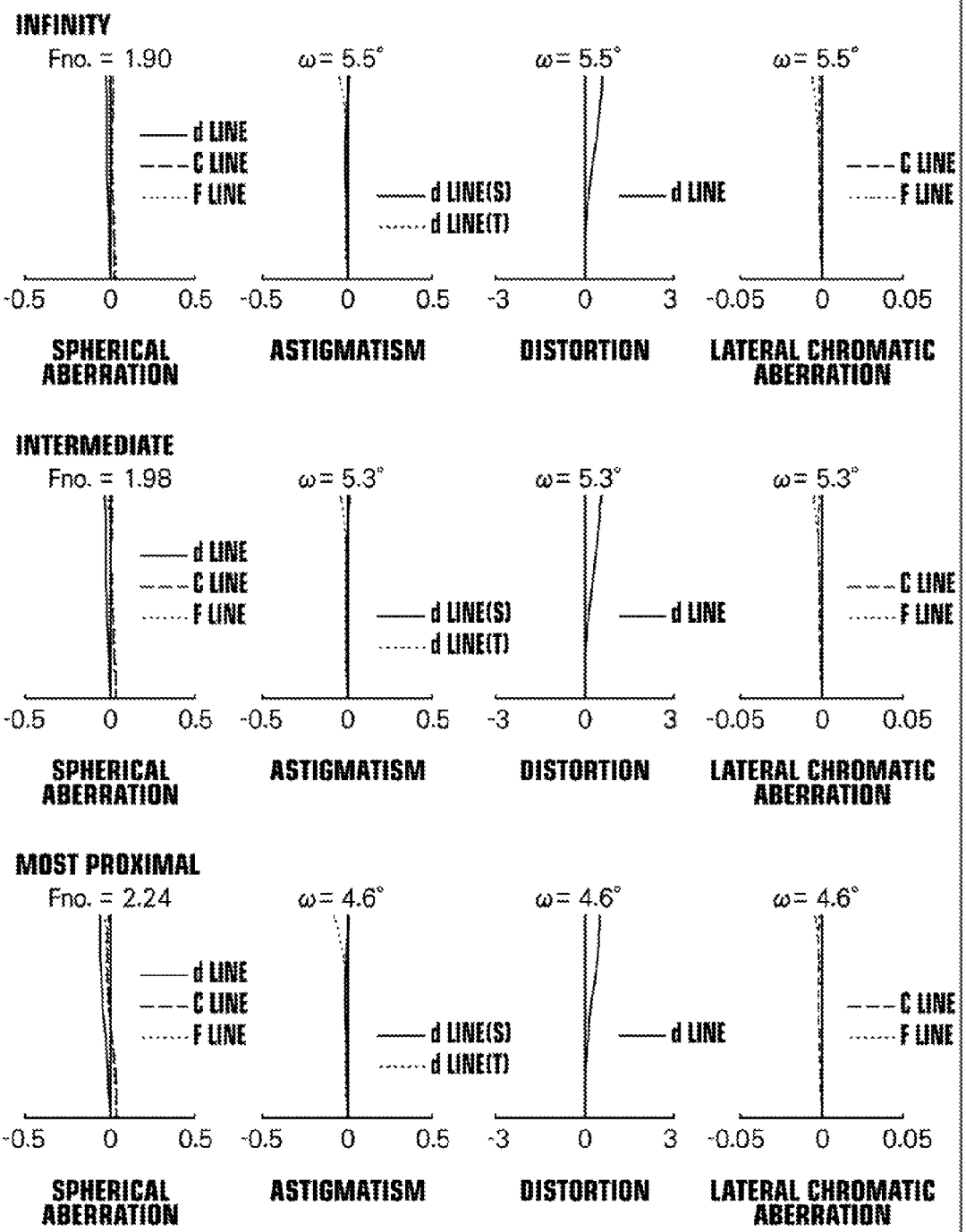
FIG. 11 is a collection of diagrams that illustrate aberrations of the imaging lens of Example 3 of the present disclosure.

Next, an imaging lens of Example 3 will be described. FIG. 3 is a cross sectional diagram that illustrates the lens configuration of the imaging lens of Example 3. In addition, basic lens data are shown in Table 7, data related to various items are shown in Table 8, and data related to distances among movable surfaces are shown in Table 9 for the imaging lens of Example 3. Various aberrations of the imaging lens of Example 3 are illustrated in the diagrams of FIG. 11. The imaging lens of Example 3 is the same as that of Example 2, except that a third lens group G3 is constituted by, in order from the object side to the image side, a negative meniscus lens L31 having a convex surface toward the object side, a positive meniscus lens L32 having a convex surface toward the object side, and a cemented lens formed by cementing a biconvex lens L33 and a positive meniscus lens L34 having a convex surface toward the object side together. In addition, the imaging lens of Example 3 is configured such that a first lens group G1, an aperture stop St, and a second lens group G2 move integrally during focusing operations.

TABLE 7

Example 3: Lens Data

| Surface Number | Radius of Curvature | Distance | nd | vd |
|---|---|---|---|---|
| 1 | 60.47081 | 5.544 | 1.58913 | 61.13 |
| 2 | 234.46500 | 0.056 | | |
| 3 | 50.09006 | 8.431 | 1.49700 | 81.54 |
| 4 | −416.96297 | 1.406 | 1.51742 | 52.43 |
| 5 | 534.63464 | 1.132 | | |
| 6 | 154.83207 | 7.327 | 1.80400 | 46.58 |
| 7 | 26.69336 | 8.404 | 1.49700 | 81.54 |
| 8 | 874.70964 | 2.728 | | |
| 9 | −103.49391 | 6.018 | 1.48749 | 70.24 |
| 10 | 415.49390 | 5.146 | | |
| 11 | 25.38863 | 6.645 | 1.84666 | 23.88 |

TABLE 7-continued

Example 3: Lens Data

| Surface Number | Radius of Curvature | Distance | nd | νd |
|---|---|---|---|---|
| 12 | 20.75901 | 6.223 | | |
| 13 | ∞ | 4.301 | | |
| (aperture stop) | | | | |
| 14 | −62.98479 | 1.476 | 1.48749 | 70.44 |
| 15 | 19.79094 | 6.724 | 1.49700 | 81.54 |
| 16 | −88.11633 | 1.998 | | |
| 17 | 45.73709 | 5.208 | 1.51633 | 64.14 |
| 18 | −1391.46217 | DD [18] | | |
| 19 | 35.23079 | 4.994 | 1.80000 | 29.84 |
| 20 | 16.93045 | 2.218 | | |
| 21 | 42.26351 | 1.398 | 1.43875 | 94.94 |
| 22 | 80.06690 | 1.717 | | |
| 23 | −112.43783 | 0.819 | 1.51633 | 64.14 |
| 24 | 16.48439 | 3.542 | 1.83481 | 42.72 |
| 25 | 13305.39045 | 14.375 | | |
| 26 | ∞ | 1.293 | 1.51633 | 64.14 |
| 27 | ∞ | 4.987 | | |

TABLE 8

Example 3: Items (d line)

| Focus Position | Infinity | Intermediate | Proximate |
|---|---|---|---|
| β | 0 | −0.026 | −0.134 |
| FNo. | 1.90 | 1.98 | 2.24 |
| 2ω (°) | 11.0 | 10.6 | 9.2 |

TABLE 9

Example 3: Variable Distances

| Focus Position | Infinity | Intermediate | Proximate |
|---|---|---|---|
| DD [18] | 3.986 | 6.319 | 13.402 |

Figure 4:
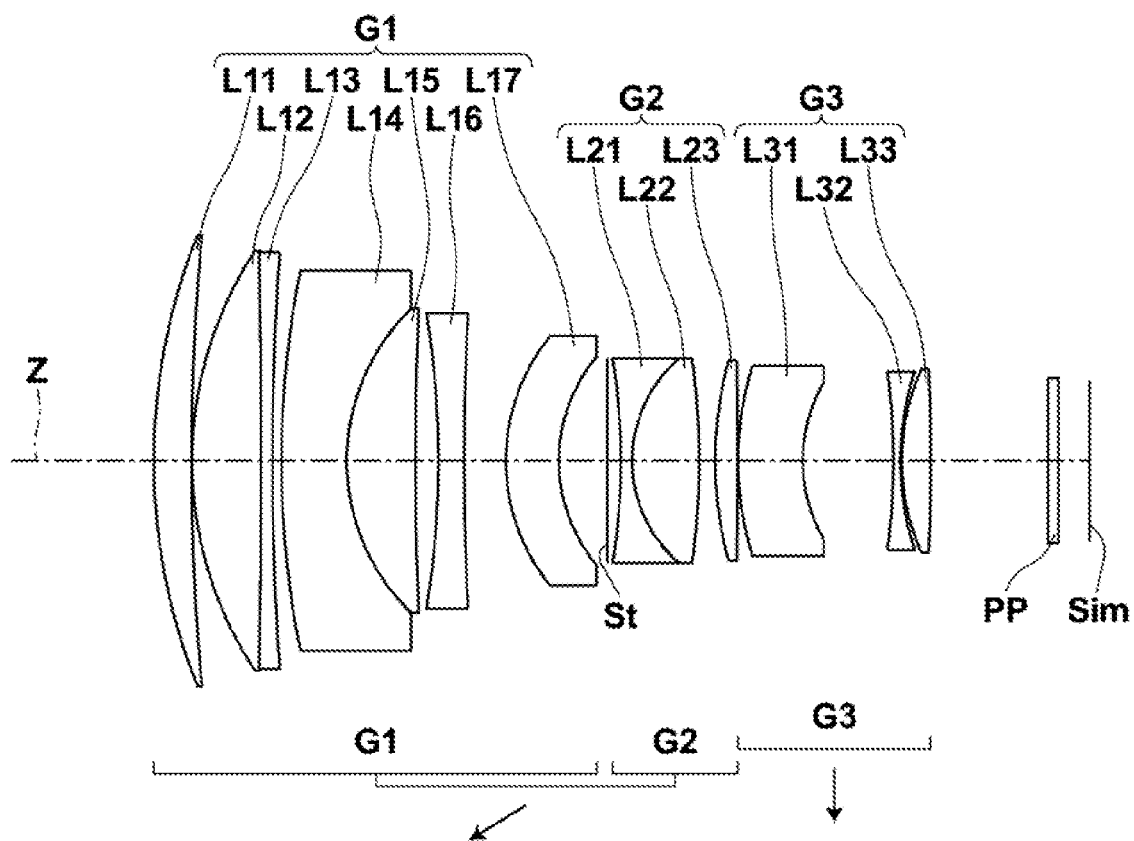
FIG. 4 is a cross sectional diagram that illustrates the lens configuration of an imaging lens according to Example 4 of the present disclosure.
Figure 12:
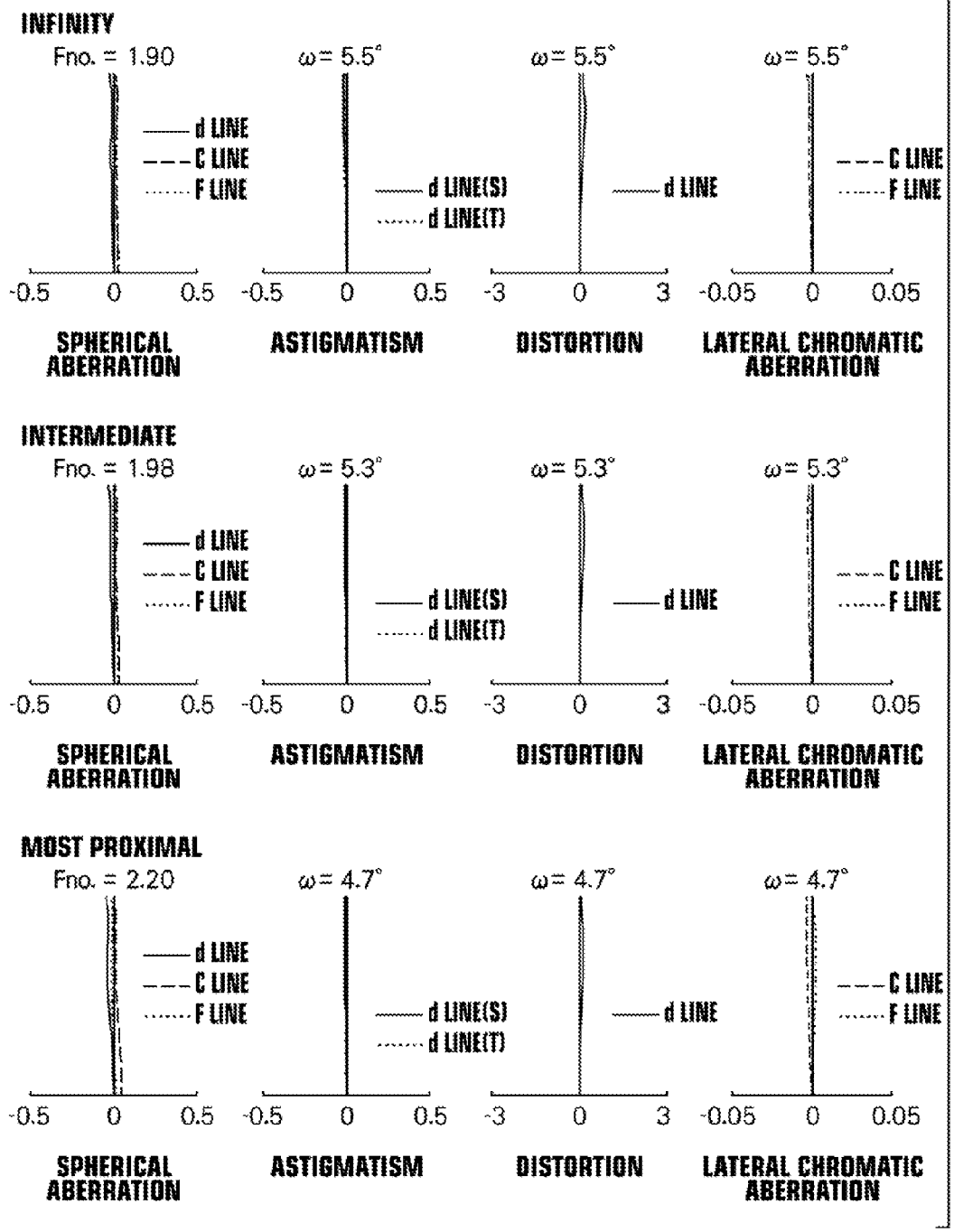
FIG. 12 is a collection of diagrams that illustrate aberrations of the imaging lens of Example 4 of the present disclosure.

Next, an imaging lens of Example 4 will be described. FIG. 4 is a cross sectional diagram that illustrates the lens configuration of the imaging lens of Example 4. In addition, basic lens data are shown in Table 10, data related to various items are shown in Table 11, and data related to distances among movable surfaces are shown in Table 12 for the imaging lens of Example 4. Various aberrations of the imaging lens of Example 4 are illustrated in the diagrams of FIG. 12. The imaging lens of Example 4 is the same as that of Example 2, except that a third lens group G3 is constituted by, in order from the object side to the image side, a negative meniscus lens L31 having a convex surface toward the object side, a biconcave lens L32, and a biconvex lens L33. In addition, the imaging lens of Example 3 is configured such that a first lens group G1, an aperture stop St, and a second lens group G2 move integrally during focusing operations. A reduction in cost can be achieved compared to the imaging lens of Example 2, by configuring the third lens group G3 to have three lenses in this manner.

TABLE 10

Example 4: Lens Data

| Surface Number | Radius of Curvature | Distance | nd | νd |
|---|---|---|---|---|
| 1 | 72.81448 | 4.587 | 1.58913 | 61.13 |
| 2 | 301.94910 | 0.056 | | |
| 3 | 45.97738 | 8.360 | 1.49700 | 81.54 |
| 4 | −1335.69178 | 1.392 | 1.51742 | 52.43 |
| 5 | 360.16938 | 1.114 | | |
| 6 | 116.55587 | 7.925 | 1.80400 | 46.58 |
| 7 | 25.49769 | 8.354 | 1.49700 | 81.54 |
| 8 | 429.52075 | 2.771 | | |
| 9 | −110.66746 | 3.124 | 1.48749 | 70.24 |
| 10 | 325.97943 | 5.074 | | |
| 11 | 23.83798 | 6.481 | 1.84666 | 23.88 |
| 12 | 19.57657 | 5.858 | | |
| 13 | ∞ | 1.651 | | |
| (aperture stop) | | | | |
| 14 | −78.60247 | 1.398 | 1.48749 | 70.44 |
| 15 | 16.26192 | 8.100 | 1.49700 | 81.54 |
| 16 | −92.98610 | 1.979 | | |
| 17 | 46.26987 | 2.699 | 1.51633 | 64.14 |
| 18 | −844.30294 | DD [18] | | |
| 19 | 38.06157 | 7.884 | 1.80000 | 29.84 |
| 20 | 18.95929 | 10.974 | | |
| 21 | −85.55349 | 0.874 | 1.51633 | 64.14 |
| 22 | 34.57863 | 0.177 | | |
| 23 | 26.91339 | 3.508 | 1.83481 | 42.72 |
| 24 | −269.95078 | 14.240 | | |
| 25 | ∞ | 1.281 | 1.51633 | 64.14 |
| 26 | ∞ | 4.284 | | |

TABLE 11

Example 4: Items (d line)

| Focus Position | Infinity | Intermediate | Proximate |
|---|---|---|---|
| β | 0 | −0.026 | −0.134 |
| FNo. | 1.90 | 1.98 | 2.20 |
| 2ω (°) | 11.0 | 10.6 | 9.4 |

TABLE 12

Example 4: Variable Distances

| Focus Position | Infinity | Intermediate | Proximate |
|---|---|---|---|
| DD [18] | 0.056 | 2.009 | 7.896 |

Figure 5:
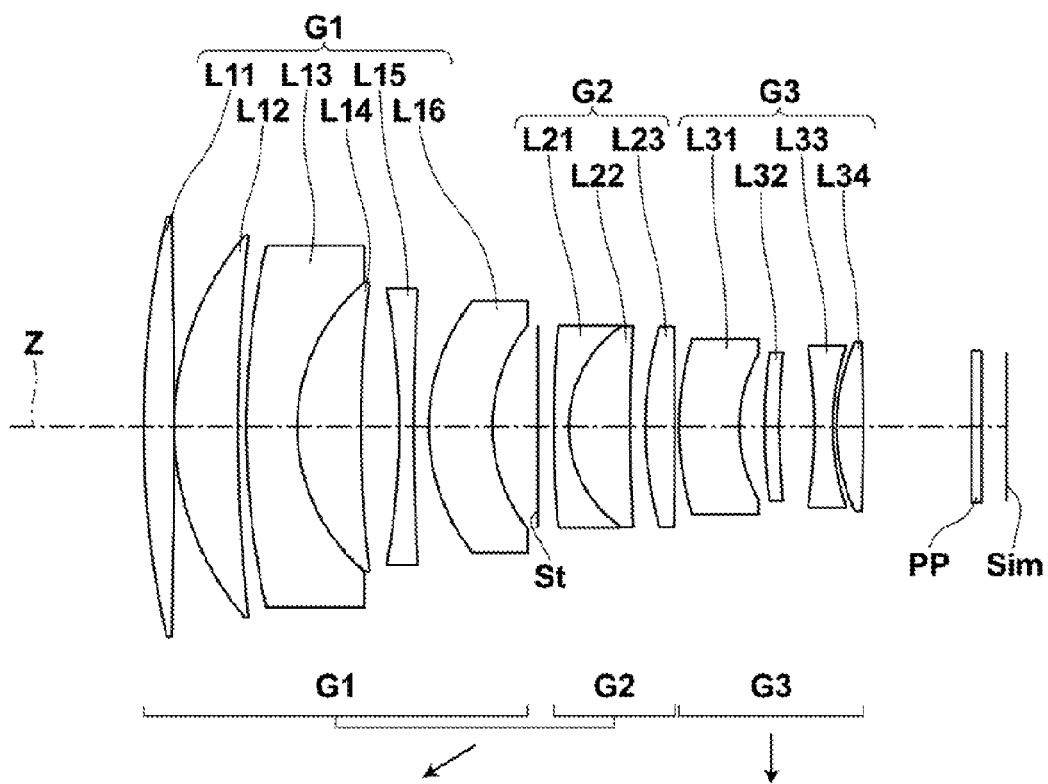
FIG. 5 is a cross sectional diagram that illustrates the lens configuration of an imaging lens according to Example 5 of the present disclosure.

Next, an imaging lens of Example 5 will be described. FIG. 5 is a cross sectional diagram that illustrates the lens configuration of the imaging lens of Example 5. In addition, basic lens data are shown in Table 13, data related to various items are shown in Table 14, and data related to distances among movable surfaces are shown in Table 15 for the imaging lens of Example 5. Various aberrations of the imaging lens of Example 5 are illustrated in the diagrams of FIG. 13. The imaging lens of Example 5 is the same as the imaging lens of Example 2, except that a first lens group G1 is constituted by, in order from the object side to the image side, a biconvex lens L11, a positive meniscus lens L12 having a convex surface toward the object side, a cemented lens formed by cementing a negative meniscus lens L13 having a convex surface toward the object side and a positive meniscus lens L14 together, a biconcave lens L15, and a negative meniscus lens L16 having a convex surface toward the object side, and that a second lens group G2 is constituted by a cemented lens formed by cementing a negative meniscus lens L21 having a convex surface toward the object side and a positive meniscus lens L22 together, and a biconvex lens L23. In addition, the imaging lens of Example 5 is configured such that the first lens group G1, an aperture stop St, and the second lens group G2 move integrally during focusing operations. A reduction in cost can be achieved compared to the imaging lens of Example 2, by configuring the first lens group G1 to have six lenses in this manner. In addition, the generation of spherical aberration can be suppressed, by the lens L12 being a positive meniscus lens.

TABLE 13

Example 5: Lens Data

| Surface Number | Radius of Curvature | Distance | nd | vd |
|---|---|---|---|---|
| 1 | 124.58434 | 3.983 | 1.58913 | 61.13 |
| 2 | −1223.33480 | 0.056 | | |
| 3 | 38.09190 | 8.338 | 1.49700 | 81.54 |
| 4 | 226.71194 | 1.112 | | |
| 5 | 108.78360 | 6.655 | 1.80400 | 46.58 |
| 6 | 24.51302 | 8.338 | 1.49700 | 81.54 |
| 7 | 156.24007 | 5.027 | | |
| 8 | −98.45208 | 1.946 | 1.48749 | 70.24 |
| 9 | 331.32846 | 1.921 | | |
| 10 | 26.40716 | 8.338 | 1.84666 | 23.88 |
| 11 | 21.20325 | 6.010 | | |
| 12 (aperture stop) | ∞ | 2.085 | | |
| 13 | 147.88258 | 1.952 | 1.48749 | 70.44 |
| 14 | 15.95701 | 8.087 | 1.49700 | 81.54 |
| 15 | 225.97578 | 1.976 | | |
| 16 | 47.28812 | 3.850 | 1.51633 | 64.14 |
| 17 | −590.89544 | DD [17] | | |
| 18 | 38.83063 | 7.885 | 1.80000 | 29.84 |
| 19 | 19.30086 | 3.311 | | |
| 20 | 72.60732 | 1.946 | 1.43875 | 94.94 |
| 21 | 98.68357 | 4.540 | | |
| 22 | −70.26332 | 2.443 | 1.51633 | 64.14 |
| 23 | 32.30374 | 0.510 | | |
| 24 | 26.80944 | 3.502 | 1.83481 | 42.72 |
| 25 | −245.19662 | 14.214 | | |
| 26 | ∞ | 1.279 | 1.51633 | 64.14 |
| 27 | ∞ | 3.796 | | |

TABLE 14

Example 5: Items (d line)

| Focus Position | Infinity | Intermediate | Proximate |
|---|---|---|---|
| β | 0 | −0.026 | −0.134 |
| FNo. | 1.90 | 1.97 | 2.20 |
| 2ω (°) | 11.0 | 10.4 | 9.4 |

TABLE 15

Example 5: Variable Distances

| Focus Position | Infinity | Intermediate | Proximate |
|---|---|---|---|
| DD [17] | 0.556 | 2.542 | 8.579 |

Figure 6:
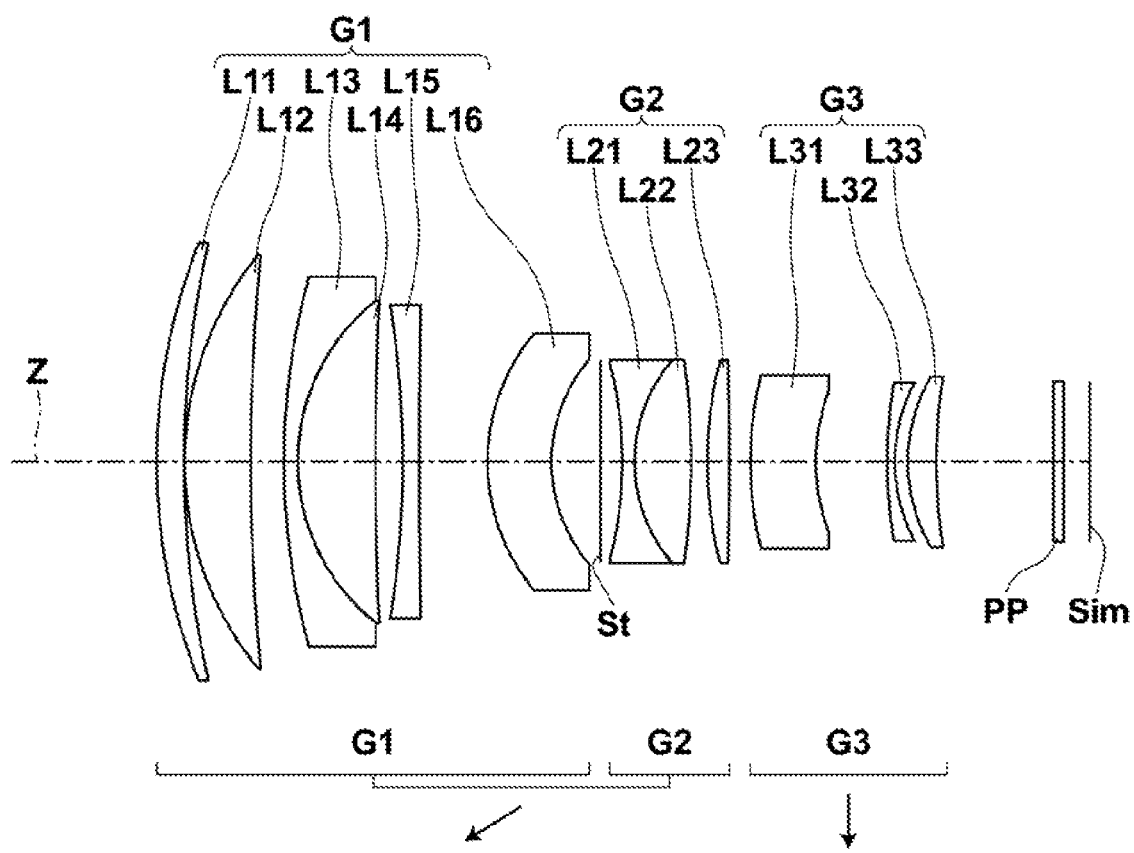
FIG. 6 is a cross sectional diagram that illustrates the lens configuration of an imaging lens according to Example 6 of the present disclosure.

Next, an imaging lens of Example 6 will be described. FIG. 6 is a cross sectional diagram that illustrates the lens configuration of the imaging lens of Example 6. In addition, basic lens data are shown in Table 16, data related to various items are shown in Table 17, and data related to distances among movable surfaces are shown in Table 18 for the imaging lens of Example 6. Various aberrations of the imaging lens of Example 6 are illustrated in the diagrams of FIG. 14. The imaging lens of Example 6 is the same as the imaging lens of Example 2, except that a first lens group G1 is constituted by, in order from the object side to the image side, a positive meniscus lens L11 having a convex surface toward the object side, a positive meniscus lens L12 having a convex surface toward the object side, a cemented lens formed by cementing a negative meniscus lens L13 having a convex surface toward the object side and a positive meniscus lens L14 together, a biconcave lens L15, and a negative meniscus lens L16 having a convex surface toward the object side, and that a third lens group G3 is constituted by, in order from the object side to the image side, a negative meniscus lens L31 having a convex surface toward the object side, a negative meniscus lens L32 having a convex surface toward the object side, and a positive meniscus lens L33 having a convex surface toward the object side. In addition, the imaging lens of Example 6 is configured such that the first lens group G1, an aperture stop St, and the second lens group G2 move integrally during focusing operations.

TABLE 16

Example 6: Lens Data

| Surface Number | Radius of Curvature | Distance | nd | vd |
|---|---|---|---|---|
| 1 | 71.28732 | 3.336 | 1.58913 | 61.13 |
| 2 | 121.03273 | 0.056 | | |
| 3 | 39.59767 | 8.071 | 1.49700 | 81.54 |
| 4 | 261.03112 | 4.057 | | |
| 5 | 83.89538 | 1.674 | 1.80400 | 46.58 |
| 6 | 24.81448 | 9.451 | 1.49700 | 81.54 |
| 7 | 393.71051 | 3.328 | | |
| 8 | −120.81951 | 2.052 | 1.48749 | 70.24 |
| 9 | 1397.47845 | 8.315 | | |
| 10 | 24.21978 | 7.824 | 1.84666 | 23.88 |
| 11 | 19.02643 | 5.983 | | |
| 12 (aperture stop) | ∞ | 2.650 | | |
| 13 | −47.97491 | 1.502 | 1.48749 | 70.24 |
| 14 | 18.74442 | 6.898 | 1.49700 | 81.54 |
| 15 | −88.64604 | 1.976 | | |
| 16 | 49.65865 | 2.691 | 1.51633 | 64.14 |
| 17 | −370.54408 | DD [17] | | |
| 18 | 43.43435 | 7.992 | 1.80000 | 29.84 |
| 19 | 24.05323 | 8.713 | | |
| 20 | 58.08512 | 0.911 | 1.56384 | 60.67 |
| 21 | 20.45822 | 1.584 | | |
| 22 | 20.50448 | 3.502 | 1.81600 | 46.62 |
| 23 | 69.14279 | 14.216 | | |
| 24 | ∞ | 1.279 | 1.51633 | 64.14 |
| 25 | ∞ | 3.690 | | |

TABLE 17

Example 6: Items (d line)

| Focus Position | Infinity | Intermediate | Proximate |
|---|---|---|---|
| β | 0 | −0.026 | −0.134 |
| FNo. | 1.93 | 1.99 | 2.25 |
| 2ω (°) | 11.0 | 10.4 | 9.2 |

TABLE 18

Example 6: Variable Distances

| Focus Position | Infinity | Intermediate | Proximate |
|---|---|---|---|
| DD [17] | 2.555 | 5.004 | 12.550 |

Figure 7:
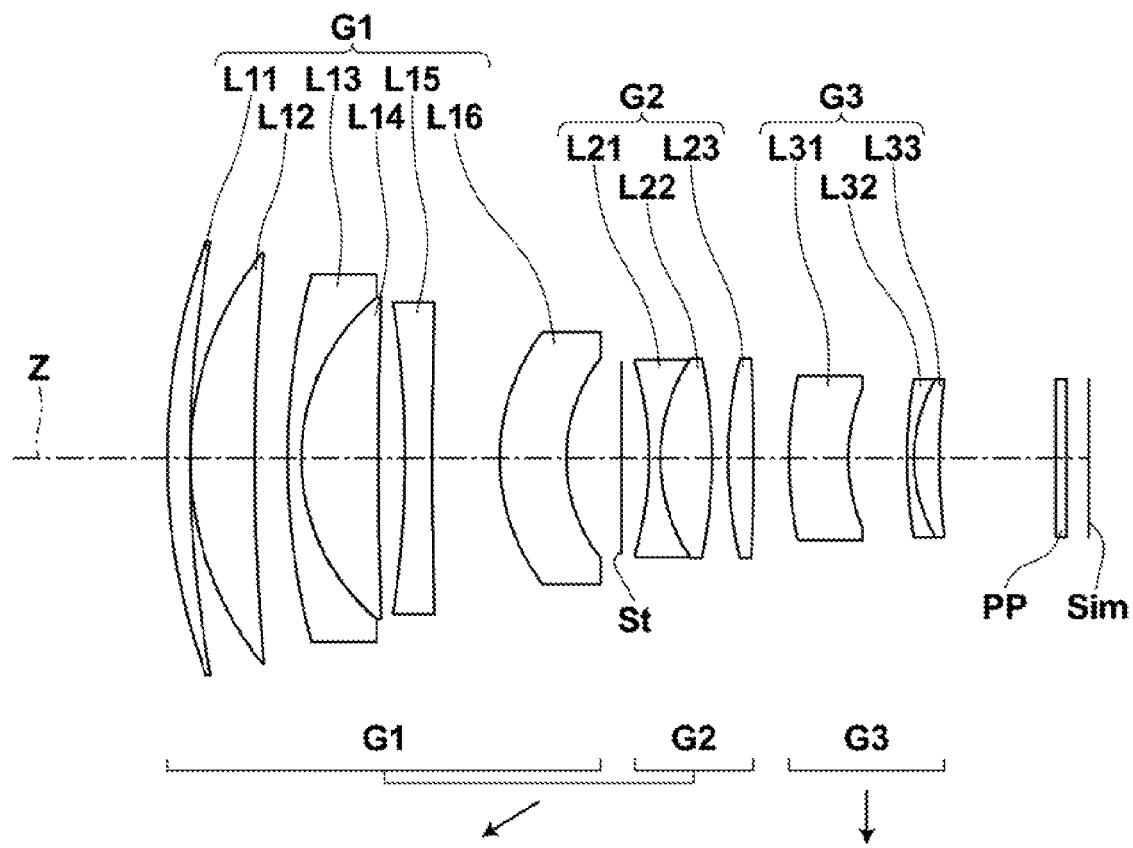
FIG. 7 is a cross sectional diagram that illustrates the lens configuration of an imaging lens according to Example 7 of the present disclosure.
Figure 15:
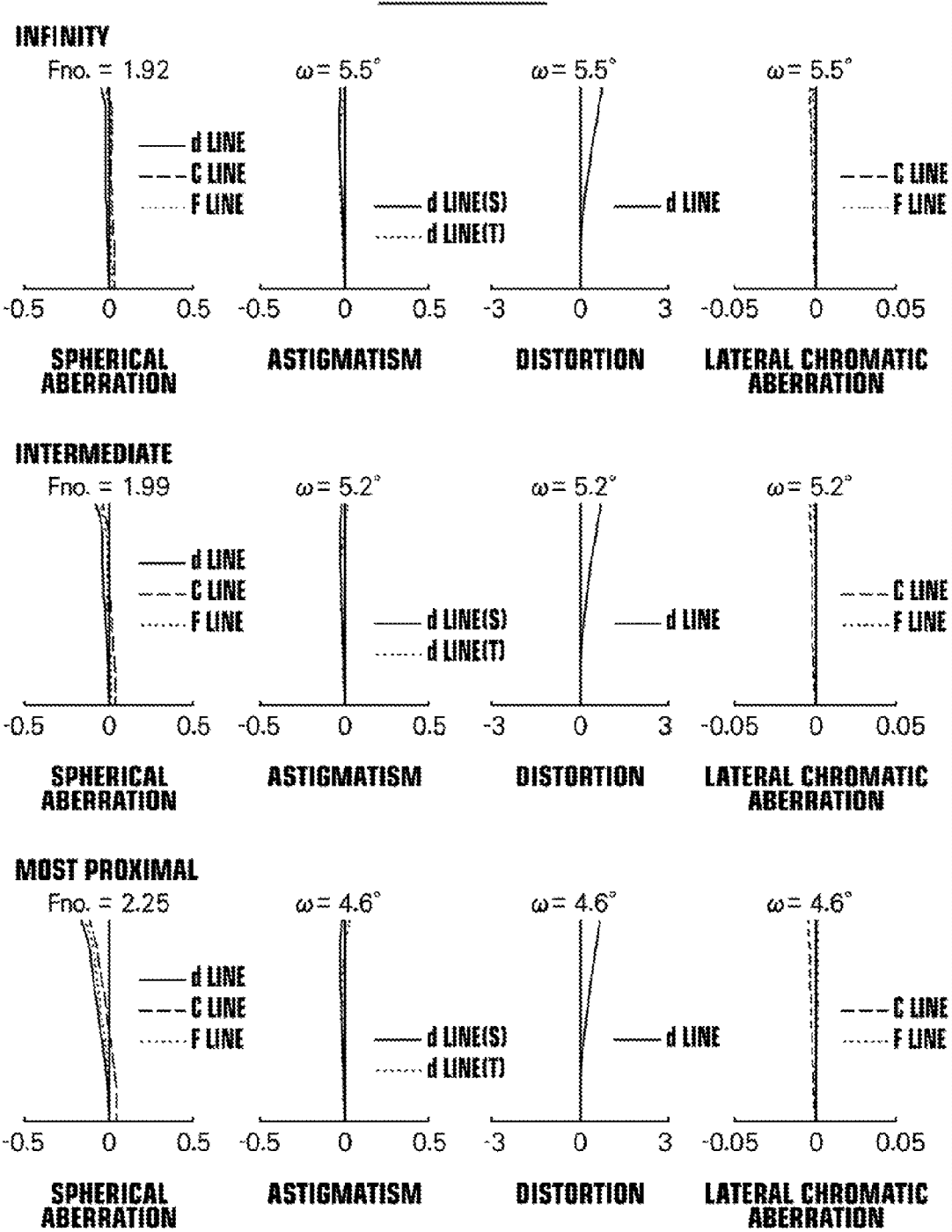
FIG. 15 is a collection of diagrams that illustrate aberrations of the imaging lens of Example 7 of the present disclosure.

Next, an imaging lens of Example 7 will be described. FIG. 7 is a cross sectional diagram that illustrates the lens configuration of the imaging lens of Example 7. In addition, basic lens data are shown in Table 19, data related to various items are shown in Table 20, and data related to distances among movable surfaces are shown in Table 21 for the imaging lens of Example 7. Various aberrations of the imaging lens of Example 7 are illustrated in the diagrams of FIG. 15. The imaging lens of Example 7 is the same as that of Example 2, except that a third lens group G3 is constituted by, in order from the object side to the image side, a negative meniscus lens L31 having a convex surface toward the object side, and a cemented lens formed by cementing a negative meniscus lens L32 having a convex surface toward the object side and a positive meniscus lens L33 together. In addition, the imaging lens of Example 7 is configured such that the first lens group G1, an aperture stop St, and the second lens group G2 move integrally during focusing operations. The absolute value of the radius of curvature of a coupling surface can be decreased without a higher degree of precision in assembly being required by cementing the lens L32 and the lens L33 together, compared to Example 4 and Example 6, which also have three lenses within the third lens group G3. Such a configuration is advantageous from the viewpoint of correcting chromatic aberrations and field curvature.

TABLE 19

Example 7: Lens Data

| Surface Number | Radius of Curvature | Distance | nd | νd |
|---|---|---|---|---|
| 1 | 76.53859 | 2.811 | 1.58913 | 61.13 |
| 2 | 138.67549 | 0.056 | | |
| 3 | 40.33840 | 8.039 | 1.49700 | 81.54 |
| 4 | 285.06877 | 4.064 | | |
| 5 | 89.21612 | 1.693 | 1.80400 | 46.58 |
| 6 | 25.82680 | 9.557 | 1.49700 | 81.54 |
| 7 | 687.79116 | 3.244 | | |
| 8 | −124.46781 | 3.376 | 1.48749 | 70.24 |
| 9 | 739.63977 | 8.428 | | |
| 10 | 25.43092 | 8.239 | 1.84666 | 23.88 |
| 11 | 19.87277 | 6.859 | | |
| 12 (aperture stop) | ∞ | 3.391 | | |
| 13 | −39.81321 | 1.411 | 1.48749 | 70.44 |
| 14 | 21.51804 | 6.441 | 1.49700 | 81.54 |
| 15 | −62.48646 | 1.998 | | |
| 16 | 52.61954 | 3.151 | 1.51633 | 64.14 |
| 17 | −279.42877 | DD [17] | | |
| 18 | 46.03998 | 7.340 | 1.80000 | 29.84 |
| 19 | 21.87633 | 7.360 | | |
| 20 | 60.14841 | 0.849 | 1.51633 | 64.14 |
| 21 | 19.03296 | 3.137 | 1.83481 | 42.72 |
| 22 | 78.30130 | 14.375 | | |
| 23 | ∞ | 1.293 | 1.51633 | 64.14 |
| 24 | ∞ | 3.305 | | |

TABLE 20

Example 7: Items (d line)

| Focus Position | Infinity | Intermediate | Proximate |
|---|---|---|---|
| β | 0 | −0.026 | −0.134 |
| FNo. | 1.92 | 1.99 | 2.25 |
| 2ω (°) | 11.0 | 10.4 | 9.2 |

TABLE 21

Example 7: Variable Distances

| Focus Position | Infinity | Intermediate | Proximate |
|---|---|---|---|
| DD [17] | 4.370 | 6.767 | 14.088 |

Values corresponding to Conditional Formulae (1) through (6) for the imaging lenses of Examples 1 through 7 are shown in Table 22. Note that all of the Examples use the d line as a reference wavelength, and the values shown in Table 25 below are those for the reference wavelength.

TABLE 22

| | Formula Condition | Example 1 | Example 2 | Example 3 | Example 4 | Example 5 | Example 6 | Example 7 |
|---|---|---|---|---|---|---|---|---|
| (1) | −f/f3 | 0.259 | 0.240 | 0.155 | 0.232 | 0.237 | 0.011 | 0.098 |
| (2) | −f12/f3 | 0.215 | 0.201 | 0.145 | 0.198 | 0.203 | 0.010 | 0.093 |
| (3) | (R2f − R2r)/(R2f + R2r) | 0.087 | 0.083 | 0.100 | 0.098 | 0.109 | 0.120 | 0.123 |
| (4) | L2/R2f | 0.237 | 0.215 | 0.262 | 0.272 | 0.316 | 0.323 | 0.324 |
| (5) | (R1r − R1f)/(R1r + R1f) | 0.762 | 1.303 | 1.663 | 2.028 | 1.846 | 1.189 | 1.405 |
| (6) | (R3r − R3f)/(R3r + R3f) | 1.434 | 1.550 | 0.998 | 1.221 | 1.246 | 0.543 | 0.609 |

From the above data, it can be understood that all of the imaging lenses of Examples 1 through 7 satisfy Conditional Formulae (1) through (6). Therefore, it can be understood that the imaging lenses of the Examples are compact imaging lenses in which various aberrations are favorably corrected.

Figure 16:
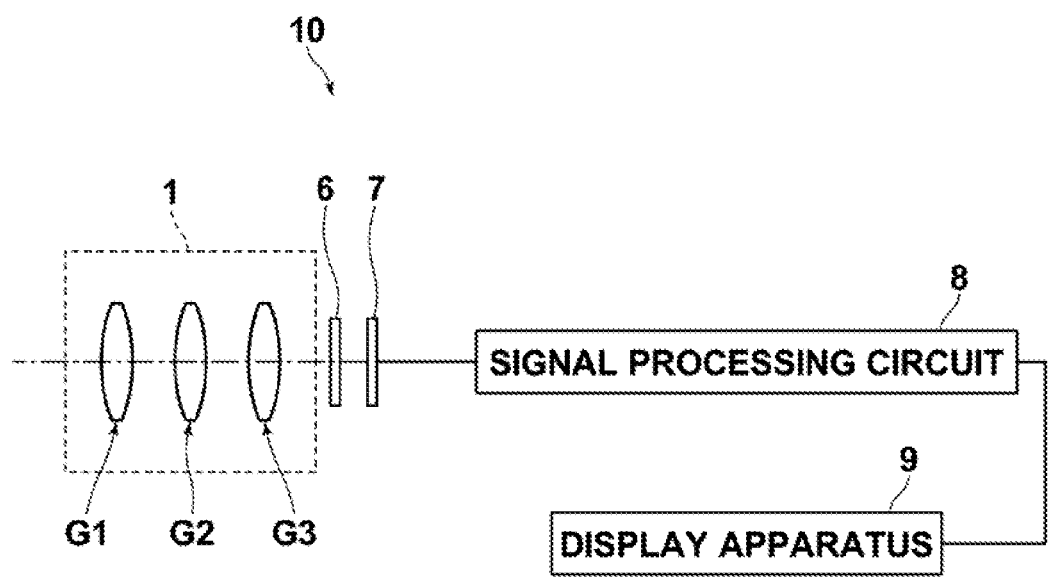
FIG. 16 is a diagram that schematically illustrates an imaging apparatus according to an embodiment of the present disclosure.

Next, an imaging apparatus according to an embodiment of the present disclosure will be described. FIG. 16 is a diagram that illustrates the schematic structure of an imaging apparatus that employs the imaging lens according to the embodiment of the present disclosure. Note that the lens groups are schematically illustrated in FIG. 16. Examples of such an imaging apparatus are a video camera and an electronic still camera that employ a solid state imaging element such as a CCD (Charge Coupled Device) and a CMOS (Complementary Metal Oxide Semiconductor) as a recording medium.

The imaging apparatus 10 illustrated in FIG. 16 is equipped with an imaging lens 1, a filter 6 having the functions of a low pass filter or the like, provided toward the image side of the imaging lens 1, an imaging element 7 provided toward the image side of the filter 6, and a signal processing circuit 8. The imaging element 7 converts optical images formed by the imaging lens 1 into electrical signals. A CCD, a CMOS, or the like may be employed as the imaging element 7. The imaging element 7 is positioned such that the image capturing surface thereof matches the imaging surface of the imaging lens 1.

Images obtained by the imaging lens 1 are formed on the image capturing surface of the imaging element 7, output signals related to the images undergo calculation processes at the signal processing circuit, and the images are displayed on a display apparatus 9.

The imaging apparatus 10 is equipped with the imaging lens 1 according to the embodiment of the present disclosure. Therefore, the imaging apparatus 10 is capable of being configured to be compact and obtaining images having high image quality.

The present disclosure has been described with reference to the embodiments and Examples. However, the present disclosure is not limited to the above embodiments and Examples, and various modifications are possible. For example, the numerical values of the radii of curvature, the distances among surfaces, the refractive indices, the Abbe's numbers, etc. of the lens components are not limited to those exemplified in the above Examples, and may be different values.

What is claimed is:

1. An imaging lens consisting of, in order from the object side to the image side:
a first lens group having a positive refractive power;
a stop;
a second lens group having a positive refractive power; and
a third lens group having a negative refractive power;
the first lens group consisting of, in order from the object side to the image side, one or more positive single lenses, one or more cemented lenses, one or more negative single lenses, and a negative meniscus single lens having a concave surface toward the image side;
the second lens group consisting of, in order from the object side to the image side, a cemented lens formed by cementing a negative lens and a biconvex lens, provided in this order from the object side to the image side, together, and a biconvex lens;
the third lens group consisting of, in order from the object side to the image side, a negative meniscus lens having a concave surface toward the image side, one or more negative lenses, and one or more positive lenses; and
focusing operations to change focus from an object at infinity to an object at a close distance being performed by moving the first lens group, the stop, and the second lens group toward the object side while the third lens group is fixed with respect to an imaging surface.

2. An imaging lens as defined in claim 1, in which Conditional Formula (1) below is satisfied:

$$0 < -f/f3 < 0.28 \quad (1)$$

wherein f is the focal length of the entire lens system, and f3 is the focal length of the third lens group.

3. An imaging lens as defined in claim 1, in which Conditional Formula (2) is satisfied:

$$0 < -f12/f3 < 0.225 \quad (2)$$

wherein f12 is the combined focal length of the first lens group and a second lens group when focused on an object at infinity, and f3 is the focal length of the third lens group.

4. An imaging lens as defined in claim 1, in which Conditional Formula (3) below is satisfied:

$$0 < (R2f - R2r)/(R2f + R2r) < 0.15 \quad (3)$$

wherein R2f is the radius of curvature of the surface toward the object side of the negative meniscus single lens within the first lens group, and R2r is the radius of curvature of the surface toward the image side of the negative meniscus single lens within the first lens group.

5. An imaging lens as defined in claim 1, in which Conditional Formula (4) below is satisfied:

$$0.18 < L2/R2f < 1.0 \quad (4)$$

wherein L2 is the central thickness of the negative meniscus single lens within the first lens group, and R2f is the radius of curvature of the surface toward the object side of the negative meniscus single lens within the first lens group.

6. An imaging lens as defined in claim 1, wherein:
a positive lens positioned most toward the image side within the second lens group is designated as a second positive lens; and
Conditional Formula (5) below is satisfied:

$$0.1 < (R1r - R1f)/(R1r + R1f) < 4.0 \quad (5)$$

wherein R1r is the radius of curvature of the surface toward the image side of a negative single lens adjacent to the negative meniscus single lens within the first lens group at the object side thereof, and R1f is the radius of curvature of the surface toward the object side of the negative single lens adjacent to the negative meniscus single lens within the first lens group at the object side thereof.

7. An imaging lens as defined in claim 1, wherein:
a cemented lens formed by cementing a negative lens having a concave surface toward the image side and a positive lens, provided in this order from the object side to the image side, together is provided adjacent to a single negative lens within the first lens group at the object side thereof.

8. An imaging lens as defined in claim 1, in which Conditional Formula (6) below is satisfied:

$$0.1 < (R3r - R3f)/(R3r + R3f) < 1.65 \quad (6)$$

wherein R3r is the radius of curvature of the surface toward the image side of a positive lens provided most toward the image side within the third lens group, and R3f is the radius of curvature of the surface toward the object side of the positive lens provided most toward the image side within the third lens group.

9. An imaging lens as defined in claim 1, wherein:
the second lens group consists of, in order from the object side to the image side, a cemented lens formed by cementing a biconcave lens and the biconvex lens, provided in this order from the object side to the image side, together, and the biconvex lens.

10. An imaging lens as defined in claim 1, wherein:
the first lens group, the stop, and the second lens group move integrally during focusing operations.

11. An imaging lens as defined in claim 1, wherein:
the first lens group and the second lens group move toward the object side such that the distance therebetween becomes greater when changing focus from an object at infinity to an object at a close distance.

12. An imaging lens as defined in claim 1, in which Conditional Formula (1-1) below is satisfied:

$$0.01 < -f/f3 < 0.26 \qquad (1\text{-}1)$$

wherein f is the focal length of the entire lens system, and f3 is the focal length of the third lens group.

13. An imaging lens as defined in claim 1, in which Conditional Formula (2-1) below is satisfied:

$$0.005 < -f12/f3 < 0.22 \qquad (2\text{-}1)$$

wherein f12 is the combined focal length of the first lens group and a second lens group when focused on an object at infinity, and f3 is the focal length of the third lens group.

14. An imaging lens as defined in claim 1, in which Conditional Formula (3-1) below is satisfied:

$$0.05 < (R2f - R2r)/(R2f + R2r) < 0.14 \qquad (3\text{-}1)$$

wherein R2f is the radius of curvature of the surface toward the object side of the negative meniscus single lens within the first lens group, and R2r is the radius of curvature of the surface toward the image side of the negative meniscus single lens within the first lens group.

15. An imaging lens as defined in claim 1, in which Conditional Formula (4-1) below is satisfied:

$$0.2 < L2/R2f < 0.6 \qquad (4\text{-}1)$$

wherein L2 is the central thickness of the negative meniscus single lens within the first lens group, and R2f is the radius of curvature of the surface toward the object side of the negative meniscus single lens within the first lens group.

16. An imaging lens as defined in claim 1, in which Conditional Formula (5-1) below is satisfied:

$$0.5 < (R1r - R1f)/(R1r + R1f) < 3.0 \qquad (5\text{-}1)$$

wherein R1r is the radius of curvature of the surface toward the image side of a negative single lens adjacent to the negative meniscus single lens within the first lens group at the object side thereof, and R1f is the radius of curvature of the surface toward the object side of the negative single lens adjacent to the negative meniscus single lens within the first lens group at the object side thereof.

17. An imaging lens as defined in claim 1, in which Conditional Formula (6-1) below is satisfied:

$$0.2 < (R3r - R3f)/(R3r + R3f) < 1.6 \qquad (6\text{-}1)$$

wherein R3r is the radius of curvature of the surface toward the image side of a positive lens provided most toward the image side within the third lens group, and R3f is the radius of curvature of the surface toward the object side of the positive lens provided most toward the image side within the third lens group.

18. An imaging apparatus equipped with an imaging lens as defined in claim 1.

* * * * *